United States Patent
Doke et al.

[11] Patent Number: 6,071,111
[45] Date of Patent: Jun. 6, 2000

[54] MOLD ASSEMBLY FOR FORMING CONTACT LENS BLANK

[75] Inventors: Atsuhiro Doke, Kasugai; Yasuhiro Yokoyama, Gifu; Kunio Maruyama, Nagoya, all of Japan

[73] Assignee: Menicon Co., Ltd., Japan

[21] Appl. No.: 09/080,772

[22] Filed: May 18, 1998

[30] Foreign Application Priority Data

May 20, 1997 [JP] Japan ................................. 9-129855

[51] Int. Cl.[7] .................................................. B29D 11/00
[52] U.S. Cl. ........................ 425/412; 249/160; 264/1.32; 264/318; 425/416; 425/423; 425/808; 425/DIG. 58
[58] Field of Search .................................. 425/195, 412, 425/416, 420, 423, 808, DIG. 58; 204/1.32, 2.2, 2.7, 318; 249/117, 160, 165, 166, 168, 141

[56] References Cited

U.S. PATENT DOCUMENTS

| | | | |
|---|---|---|---|
| 2,304,984 | 12/1942 | Wood | 425/808 |
| 3,278,285 | 10/1966 | Pickering | 425/412 |
| 3,841,598 | 10/1974 | Grucza | 425/808 |
| 4,113,224 | 9/1978 | Clark et al. | 264/2.2 |
| 4,121,896 | 10/1978 | Shepherd | 425/412 |
| 4,197,266 | 4/1980 | Clark et al. | |
| 4,209,289 | 6/1980 | Newcomb et al. | 264/2.2 |
| 4,211,384 | 7/1980 | Bourset et al. | 249/160 |
| 4,474,355 | 10/1984 | Greshes | 249/117 |
| 4,569,807 | 2/1986 | Boudet | 264/2.2 |
| 4,839,110 | 6/1989 | Kingsbury | 425/808 |
| 4,865,779 | 9/1989 | Ihn et al. | 264/2.2 |
| 5,137,441 | 8/1992 | Fogarty | 425/412 |
| 5,160,749 | 11/1992 | Fogarty | 425/412 |

FOREIGN PATENT DOCUMENTS

| | | |
|---|---|---|
| 0 484 090 | 5/1992 | European Pat. Off. . |
| 1252249 | 12/1960 | France ................................. 425/808 |
| 59-8219 | 2/1959 | Japan . |
| 57-608 | 1/1982 | Japan . |
| 3-81385 | 4/1991 | Japan . |
| 3-76213 | 12/1991 | Japan . |
| 4-11085 | 2/1992 | Japan . |
| 4-290706 | 10/1992 | Japan . |
| 7-80860 | 3/1995 | Japan . |
| 7-90241 | 4/1995 | Japan . |
| 7-80118 | 8/1995 | Japan . |
| 8-25378 | 1/1996 | Japan . |
| 2 230 730 | 10/1990 | United Kingdom . |
| 2 237 241 | 5/1991 | United Kingdom . |
| WO87-04390 | 7/1987 | WIPO . |

*Primary Examiner*—Duane S. Smith
*Attorney, Agent, or Firm*—Wall Marjama Bilinski & Burr

[57] ABSTRACT

A mold assembly for forming a lens blank which gives a contact lens includes an upper and a lower mold half which cooperate with each other to define a substantially fluid-tight mold cavity when the two halves are assembled together. The mold cavity is filled with a monomer liquid which is polymerized to provide the lens blank that is to be subjected to a cutting operation for forming a base and a front curved surface of the contact lens. The upper mold half includes a flexible thin-walled portion which has a downwardly convex shape and which partially defines the mold cavity. The thin-walled portion is deformable to absorb expansion or shrinkage of the monomer liquid during polymerization thereof in the mold cavity. The lower mold half includes a base portion at which the lower mold half is clamped by a chuck of a lathe during the cutting operation. A mold portion of the lower mold half has a molding surface which is provided with a recess or protrusion for holding the lens blank on the lower mold half. The lens blank is formed in the mold cavity defined by and between the upper and lower mold halves.

12 Claims, 17 Drawing Sheets

MOLD ASSEMBLY FOR FORMING CONTACT LENS BLANK

The present application is based on Japanese Patent Application No. 9-129855 filed May 20, 1997, the content of which is incorporated hereinto by reference.

BACKGROUND OF THE INVENTION

The present invention relates to a mold assembly for forming a contact lens blank or workpiece and a method of producing a contact lens from the formed lens blank. More specifically, the present invention is concerned with such a mold assembly for forming the lens blank, which is subsequently subjected to a cutting operation to form a base or rear curved surface and a front curved surface of an intended contact lens. The invention also relates to a method of producing a contact lens from the lens blank obtained by the mold assembly, by cutting the lens blank.

Discussion of the Related Art

A contact lens is generally fabricated from a contact lens material which is formed into a cylindrical shape by polymerization of a monomer liquid in a test tube. The conventional cylindrical contact lens material is first subjected to a turning operation with a cutting tool in the axial direction with a suitable depth of cut, so as to reduce its outside diameter, so that a bar-shaped blank having a high degree of cylindricity is obtained. Then, the thus obtained bar-shaped blank is cut into a plurality of workpieces (lens blanks) by a cut-off tool, so that each of the workpieces has a predetermined axial dimension. Each workpiece thus obtained is subjected to cutting operations to provide a desired contact lens. Namely, one of the opposite end surfaces of the workpiece is cut into a base or rear curved surface of the contact lens, i.e., an inner surface of the contact lens which is to be held in contact with the cornea of an eye, while the other end surface of the workpiece is cut into a front curved surface of the contact lens, i.e., an outer surface of the contact lens opposite to the cornea-contacting surface.

The above method, however, suffers from a problem that a large amount of the expensive contact lens material is discarded as a waste during the cutting operations, whereby the cost of the material is inevitably increased. In addition, the polymer composition of the cylindrical contact lens material is not uniform in its longitudinal direction due to a variation of the composition of the monomer liquid during the polymerization. Accordingly, the workpieces obtained by cutting the bar-shaped blank undesirably have different material compositions.

In the method as described above, the rear curved surface and the front curved surface of the contact lens are formed by cutting operations on the workpiece (lens blank).

Another method of producing a contact lens is disclosed in JP-A-57-608, JP-A-64-500256 and JP-A-4-290706, for instance, wherein a mold having a mold cavity which corresponds to a profile of the intended contact lens. More specifically described, a monomer liquid injected into the mold cavity is polymerized, so as to mold the contact lens having the profile corresponding to the shape of the mold cavity. In this method, the front and rear curved surfaces of the contact lens are formed simultaneously upon the polymerization of the monomer liquid within the mold.

In the molding method as described above, however, if the monomer liquid comprises a plurality of monomer components, each of the monomer components and the material of the mold undesirably interact with each other upon the polymerization of the monomer liquid in the mold cavity. In this case, the obtained contact lens has different compositions at its inner portion and its outer or surface portion which was held in contact with the molding surfaces of the mold, making it difficult to assure uniform or homogeneous quality of the obtained contact lens. Further, this molding method is not efficient in producing various kinds of contact lenses having different configurations.

Another method of producing a contact lens is disclosed in JP-B-59-8219, JP-B-3-76213, JP-B-4-11085, JP-A-7-080860, and JP-A-8-25378, for instance, wherein one of the front and rear curved surfaces of the intended contact lens is formed during polymerization of the monomer liquid within the mold cavity, while the other curved surface is formed by a cutting operation. In this method, too, since one of the front and rear curved surfaces is formed during the polymerization of the monomer liquid, so as to have a configuration corresponding to that of the molding surface, the obtained contact lens suffers from different compositions at its surface and inner portions due to a variation of the monomer composition caused by the interaction with the material of the mold.

SUMMARY OF THE INVENTION

It is therefore a first object of the present invention to provide a mold assembly for forming a contact lens blank that gives a contact lens, which lens blank can be formed into various kinds of contact lenses that are uniform in quality and free from distortion, while minimizing the amount of wasting of the lens blank, permitting mass-production of the contact lens at a relatively reduced cost.

It is a second object of the present invention to provide a method of producing a desired contact lens from the lens blank which is obtained by using such a mold assembly.

The above first object of the present invention may be attained according to a first aspect of the present invention, which provides a mold assembly for forming a lens blank which gives a contact lens, the mold assembly comprising an upper mold half and a lower mold half which cooperate with each other to define a substantially fluid-tight mold cavity when the upper and lower mold halves are assembled together, the mold cavity being filled with a monomer liquid which is polymerized to provide the lens blank that is to be subjected to a cutting operation for forming a base curved surface and a front curved surface of the contact lens, wherein the improvement comprises: the upper mold half including a flexible thin-walled portion which has a downwardly convex shape and which partially defines the mold cavity, the thin-walled portion being deformable so as to absorb expansion or shrinkage of the monomer liquid during polymerization thereof in the mold cavity; and the lower mold half including a base portion at which the lower mold half is clamped by a chuck of a lathe during the cutting operation, and a mold portion having a molding surface which is provided with lens blank holding means for holding the lens blank on the lower mold half, the lens blank being formed in the mold cavity defined by and between the upper and lower mold halves.

The lens blank mold assembly constructed according to the present invention provides a lens blank whose size is close to that of the contact lens to be formed. The formed lens blank is subjected to the cutting operation at its opposite surfaces so as to provide the front and rear curved surfaces of the contact lens, whereby various kinds or types of contact lenses having different configurations can be easily produced while minimizing the amount of the expensive contact lens material to be discarded as a waste. In the present arrangement, the front and rear curved surfaces of the contact lens can be obtained by effecting the cutting operation on the opposite surfaces of the lens blank. Where the lens blank is obtained by polymerization of the monomer liquid which comprises a plurality of monomer components, the obtained lens blank may suffer from the conventionally experienced problem that the lens blank has different compositions at its inner portion and its outer portion which was held in contact with the molding surface of the mold, because the interaction between a hydrophilic monomer(s) of the monomer components and the material of the mold is different from the interaction between a hydrophobic monomer(s) of the monomer components and the material of the mold. However, in the present invention, since the outer or surface portion of the lens blank is removed by the cutting operation for providing the front and rear curved surfaces of the contact lens, the obtained contact lens is uniform in composition over its entire mass.

The lower mold half of the present mold assembly has the lens blank holding means for holding the lens blank thereon. In this arrangement, when the upper and lower mold halves are disassembled and separated from each other upon termination of the polymerization of the monomer liquid in the mold cavity, the lens blank formed by the polymerization remains on the side of the lower mold half. Subsequently, the lower mold half which holds the lens blank thereon is clamped by the chuck of the lathe at its base portion. In this state, the lens blank which is held by the lower mold half is subjected to the cutting operation for forming a predetermined rear curved surface of the contact lens. Thus, the intended contact lens can be produced in a simplified process wherein the formation of the lens blank (the polymerization of the lens blank material) and the cutting or machining operations on the lens blank are successively effected.

In the present mold assembly, a portion of the upper mold half, which portion partially defines the mold cavity, is formed in a downwardly curved or convex shape. This arrangement permits bubbles existing in the monomer liquid to move from the central portion of the mold cavity toward its outer peripheral portion along the surface of the curved convex portion of the upper mold half upon assembling the upper mold half with the lower mold half for forming the substantially fluid-tightly sealed mold cavity therebetween. Accordingly, the lens blank to be formed by the polymerization of the monomer liquid is free from defects such as voids due to the bubbles which would otherwise be trapped in its central portion.

Further, in the present invention, the convex portion of the upper mold half is thin-walled and deformable. The deformable thin-walled convex portion of the upper mold half is capable of effectively absorbing the expansion or shrinkage of the monomer liquid within the mold cavity upon its polymerization. This arrangement is effective to reduce a residual strain of the lens blank to be obtained, and to prevent the lens blank from being adversely influenced by the shrinkage of the monomer liquid, whereby the obtained lens blank has an intended configuration.

In a first preferred form of the above first aspect of the present invention, the base portion of the lower mold half is a hollow cylindrical member, and includes reinforcing means provided in the hollow cylindrical member. This arrangement effectively increases the mechanical strength of the base portion of the lower mold half at which the lower mold half is clamped by the chuck of the lathe, to thereby prevent the lower mold half from being deformed or deflected when it is clamped by the chuck. Therefore, the lens blank can be appropriately held in position by the lower mold half during the cutting operation, so that the obtained contact lens does not suffer from any deformation or deflection.

In a second preferred form of the above first aspect of the present invention, the lens blank holding means comprises a recess or protrusion provided on the molding surface of the lower mold half, the recess or the protrusion giving the lens blank an anchor portion for holding the lens blank on the base portion. Owing to the anchor portion formed in the lens blank, the lens blank can be held on the lower mold half, so that the lens blank is prevented from being removed away from the lower mold half during the cutting operation.

In a third preferred form of the above first aspect of the present invention, the lower mold half includes a base member having the base portion and a sleeve member which removably and fluid-tightly engages the base member, the lens blank holding means being provided on the base member. The base member and the sleeve member of the lower mold half cooperate with the upper mold half to provide a three-piece structure of the mold assembly according to the present invention. In this arrangement, the lower mold half includes two separate members, i.e., the base member and the sleeve member, making it easier to inject the monomer liquid into the mold cavity. Further, according to this arrangement, the mold cavity is partially defined by the inner surface of the sleeve member and the molding surface of the base member. In disassembling the present mold assembly, the upper mold half and the sleeve member can be removed from the base member one after the other. In other words, the upper mold half and the sleeve member need not be simultaneously separated form the contacting surfaces of the lens blank. Since forces respectively required to separate the upper mold half and the sleeve member are relatively small, the obtained lens blank can remain on the base member of the lower mold half.

In a fourth preferred form of the above first aspect of the present invention, the sleeve member has a tapered inner circumferential surface whose diameter reduces in an upward direction of the mold assembly while the base member has a tapered outer circumferential surface whose diameter reduces in the upward direction, the tapered inner circumferential surface of the sleeve member being fluid-tightly fitted on the tapered outer circumferential surface of the base member, so as to partially define the mold cavity. This arrangement improves the fluid-tightness or air-tightness between the base member and the sleeve member, and facilitates the removal of the sleeve member and the upper mold half from the base member.

In a fifth preferred form of the above first aspect of the present invention, the upper mold half and the lower mold half contacts each other when the upper mold half and the lower mold half are assembled together, to thereby provide a contacting portion and a storage portion for storing an excess of the monomer liquid, the storage portion being located above the contacting portion. This arrangement is effective to inhibit the obtained lens blank from being adversely influenced by the shrinkage of the monomer liquid during its polymerization, whereby the obtained lens blank has an intended configuration.

In a sixth preferred form of the above first aspect of the present invention, the sleeve member of the lower mold half includes a large-diameter portion while the upper mold half includes a cylindrical portion, the large-diameter portion of the sleeve member and the cylindrical portion of the upper mold half being radially opposed to each other with a radial distance of at least 0.2 mm therebetween when the upper and lower mold halves are assembled together. This arrangement is free from a problem that the monomer liquid in the mold cavity tends to rise along the outer surface of the upper mold half due to the surface tension when the thin-walled convex portion of the upper mold half contacts the monomer liquid during the assembling of the upper mold half with the lower mold half, causing the bubbles in the monomer liquid to remain in the mold cavity without moving toward the outer peripheral portion of the mold cavity along the convex surface of the thin-walled portion of the upper mold half.

In a seventh preferred form of the above first aspect of the present invention, the substantially fluid-tight mold cavity is sealed by a line contact or a face contact between the lower and upper mold halves when the upper and lower mold halves are assembled together.

In an eighth preferred form of the above first aspect of the present invention, the lens blank holding means provided on the molding surface of the lower mold half has an inclined surface which is inclined with respect to a direction of relative movement of the upper and lower mold halves for assembling thereof into the mold assembly, so as to prevent a cutting tool from interfering with the lens blank holding means when the lens blank held by the lower mold half is subjected to the cutting operation by the cutting tool for forming a peripheral portion and a part of the front curved surface of the contact lens while the lower mold half is clamped by the chuck and rotated on the lathe. This arrangement eliminates a possibility that the lens blank holding means of the lower mold half is cut by the cutting tool, so as to prevent the lens blank from being removed away from the lower mold half during the cutting operation.

The above-described second object of the present invention may be attained according to a second aspect of the present invention which provides a method of producing a contact lens by using an original lens blank dimensioned to give a contact lens, the original lens blank being subjected to a cutting operation so as to provide a rear curved surface and a front curved surface of the contact lens, the method comprising the steps of: (a) preparing a mold assembly as recited in the above first aspect of the present invention; (b) forming the original lens blank by injecting, into the mold cavity, a monomer liquid which gives a polymer of the contact lens, and polymerizing the monomer liquid; (c) removing the upper mold half from the lower mold half while holding the original lens blank on the lower mold half; (d) effecting a cutting operation on the original lens blank held on the lower mold half while the lower mold half is clamped by a chuck and rotated on a lathe, so as to provide a secondary lens blank which has at least the rear curved surface of the contact lens; (e) bonding a jig to the rear curved surface of the secondary lens blank, so that the secondary lens blank is held by the jig, and cutting off the secondary lens blank away from the lower mold half; (e) forming the front curved surface of the contact lens by effecting a cutting operation on the secondary lens blank held by the jig while the jig is clamped by the chuck and rotated on the lathe, so as to provide the contact lens; and (f) removing from the jig the contact lens which is finished by the cutting operation on the secondary lens blank.

According to the present method, the original lens blank obtained by polymerization of the monomer liquid filled in the mold cavity of the mold assembly as described above is held by the lower mold half. The original lens blank which is held by the lower mold half is subjected to the cutting operation for forming the rear curved surface of the contact lens while the lower mold half is clamped by the chuck of the lathe, so as to provide the secondary lens blank. Subsequently, the obtained secondary lens blank in which the rear curved surface of the intended contact lens is formed is bonded to the jig, and then subjected to the cutting operation while the jig is clamped by the chuck and rotated on the lathe, whereby the intended contact lens is produced. According to the present method, various kinds of contact lenses can be mass-produced at a reduced cost in a simplified process wherein the formation of the lens blank (i.e., the polymerization of the lens blank material) and the machining operations on the secondary lens blank can be successively effected, leading to an improvement in the automation of the process of producing the contact lens.

In a first preferred form of the above second aspect of the present invention, the lower mold half includes a base member and a sleeve member, the sleeve member fluid-tightly engaging the base member so as to define a recess that partially gives the mold cavity into which the monomer liquid is injected, the upper mold half being subsequently engaged with the sleeve member, so as to define the mold cavity filled with the monomer liquid. Since the base member and the sleeve member cooperate with each other to define the recess that cooperates with the upper mold half to define the mold cavity, the monomer liquid can be easily injected into the recess before the upper mold half is assembled with the sleeve member. Subsequently, the upper mold half is assembled with the sleeve member such that it closes the opening of the recess defined by the base member and the sleeve member, so that the mold cavity filled with the monomer liquid is provided.

In a second preferred form of the above second aspect of the present invention, the step of removing the upper mold half from the lower mold half which holds the original lens blank is effected by first removing the upper mold half from the sleeve member of the lower mold half, and then removing the sleeve member from the base member. In this arrangement, the upper mold half and the sleeve member are removed from the base member one after the other, whereby the lens blank can be effectively held on the base member.

In a third preferred form of the above second aspect of the present invention, the jig is clamped by the chuck of the lathe after the jig is bonded to the rear curved surface of the secondary lens blank held by the lower mold half, and thereafter the secondary lens blank is cut off away from the lower mold half.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF PREFERRED EMBODIMENTS

Figure 1:
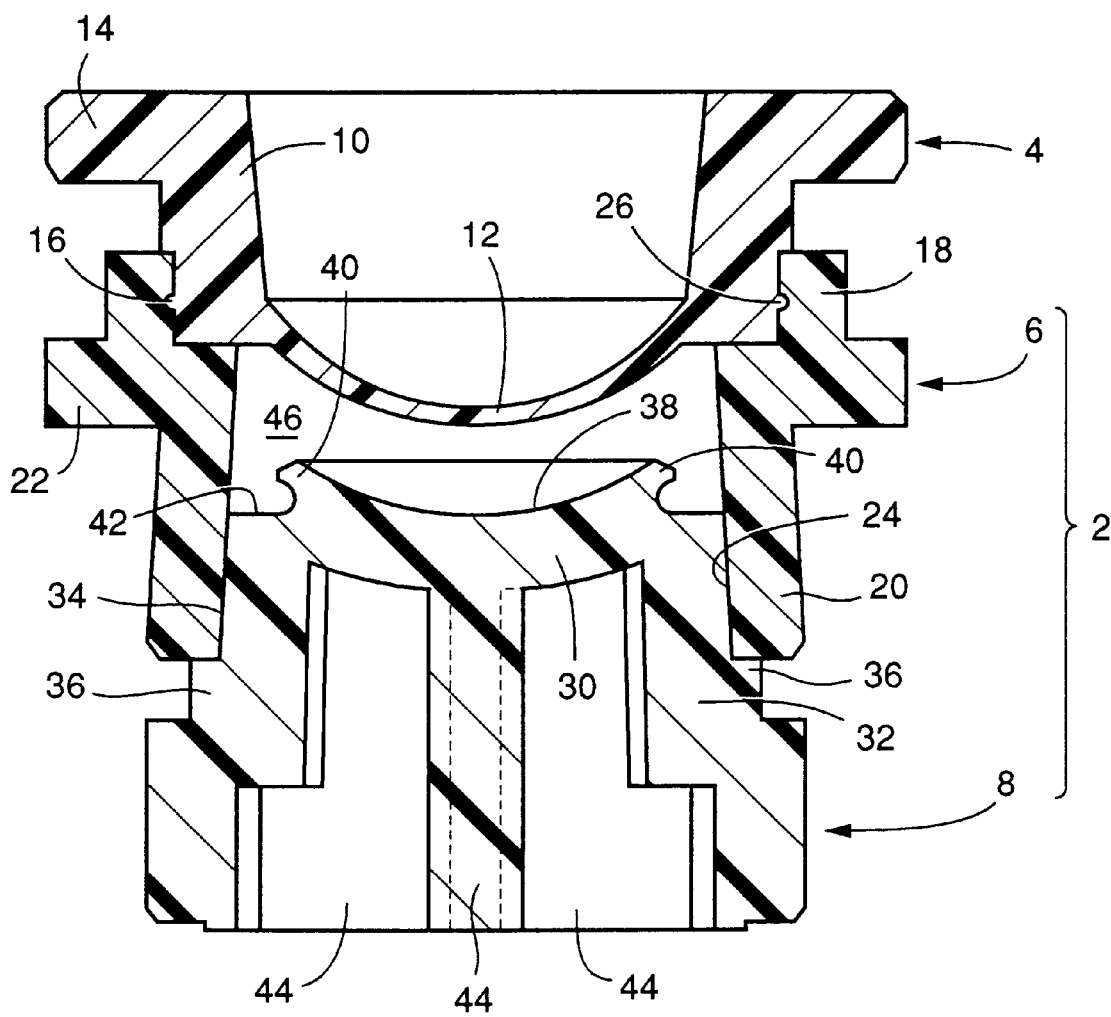
FIG. 1 is an elevational view in longitudinal cross section of a mold assembly consisting of upper and lower mold halves for forming a contact lens blank, which is constructed according to one embodiment of the present invention, the view showing the mold assembly when the upper and lower mold halves are closed together.

Referring first to FIG. 1, there is shown one embodiment of a mold assembly of the present invention for forming a blank for a contact lens. The mold assembly includes an upper mold half 4, and a lower mold half 2 which consists of a base member 8 and a sleeve member 6 which is formed separately from the base member 8. Thus, the present mold assembly is a three-piece structure.

The upper mold half 4 and the lower mold half 2 (consisting of the base member 8 and the sleeve member 6) are made of any known material. Generally, these mold halves 2, 4 are made of a synthetic resin material. Examples of the synthetic resin material for the mold halves 2, 4 include polyolefines such as polyethylene and polypropylene, polystyrene, polycarbonate, polymethyl methacrylate, a copolymer of ethylene and vinyl alcohol, polyacetal, polyamide, polyester and polysulfone. Preferably, the mold halves 2, 4 are resin structures formed by injection molding using polypropylene. It is particularly preferable that the base member 8 of the lower mold half 2 be made of the resin material since the base member 8 which holds the lens blank thereon is clamped by a chuck of a lathe or a turning machine, and a working tool such as a cutting tool may contact the base member 8 during the cutting operation on the lens blank held by the base member 8.

The upper mold half 4 of the mold assembly includes a thick-walled cylindrical portion 10, a flexible thin-walled spherical bottom wall 12 which is formed integrally with the axially lower end of the cylindrical portion 10 so as to close its lower opening, and an outer flange 14 which has a relatively large thickness and extends radially outwardly from the upper end of the cylindrical portion 10. The spherical bottom wall 12 is downwardly curved so as to have a downwardly convex shape as shown in FIG. 1. The cylindrical portion 10 has two axial sections, i.e., an upper large-diameter section and a lower small-diameter section which are located on the opposite sides of a shoulder formed at its axially intermediate portion. On the outer circumferential surface of the lower small-diameter section, there is formed an annular protrusion 16.

The sleeve member 6 of the lower mold half 2 is a stepped cylindrical member having an upper large-diameter portion 18 and a lower small-diameter portion 20. An outward flange 22 having a relatively large thickness is formed at the connection of these large-diameter and small-diameter portions 18, 20, so as to extend radially outwardly therefrom. The small-diameter portion 20 has an inner circumferential surface which is tapered in the axially upward direction of the mold assembly, with the inside diameter of the small-diameter portion 20 being gradually reduced in the axially upward direction, so as to provide a tapered inner circumferential surface 24. On the inner circumferential surface of the large-diameter portion 18, there is formed a circumferential groove 26 which engages the annular protrusion 16 of the upper mold half 4. The lower small-diameter section of the cylindrical portion 10 of the upper mold half 4 is partly received or fitted in the large-diameter portion 18 of the upper sleeve 6 of the lower mold half 2 so that the annular protrusion 16 formed on the small-diameter section of the cylindrical portion 10 engages the circumferential groove 26 formed in the large-diameter portion 18 of the sleeve member 6, whereby the upper mold half 4 and the sleeve member 6 are assembled together. The upper mold half 4 and the sleeve member 6 are separated from each other by disengaging the annular protrusion 16 from the groove 26.

The lower mold half 2 is a two-piece structure consisting of the sleeve member 6 and the base member 8 which are removably and fluid-tightly assembled together in a manner described below. The base member 8 includes a mold portion 30 and a hollow base portion 32 which is formed integrally with the mold portion 30 and extends downwardly therefrom. The base portion 32 is a stepped cylindrical member and includes three sections having different diameters, i.e., an upper section, an intermediate section, and a lower section, as shown in FIG. 1. The upper section which includes the mold portion 30 has an outer circumferential surface 34 which is tapered in the axially upward direction of the mold assembly, with the outside diameter being gradually reduced in the axially upward direction. On this tapered outer circumferential surface 34, there is fluid-tightly fitted the tapered inner circumferential surface 24 of the sleeve member 6 of the upper mold half 2.

The intermediate section of the base portion 32 which is contiguous with the upper section functions as a stop portion 36 against which the lower end of the sleeve member 6 abuts, so that the sleeve member 6 is prevented from further moving downward by the abutting contact with the stop portion 36, whereby a predetermined axial dimension of a mold cavity 46 (FIG. 3) defined by the upper mold half 4 and the lower mold half 2 (the sleeve member 6 and the base member 8) is established.

The lower section of the base portion 32 which is contiguous with the stop portion 36 has the largest outside diameter among the three sections of the base portion 32. When the sleeve member 6 is positioned relative to the base member 8 with the abutting contact of the lower end of the sleeve member 6 with the stop portion 36 of the base portion 32, there is formed an axial clearance between the lower end of the sleeve member 6 and the upper end of the lower largest-diameter section of the base portion 32. When the upper mold half 4 and the sleeve member 6 are removed from the base member 8, the base member 8 is clamped by a chuck such that jaws of the chuck contact the outer circumferential surface of the stop portion 36 through this axial clearance. In this embodiment, the sleeve member 6 engages the base member 8 such that the tapered inner circumferential surface 24 of the sleeve member 6 is fitted on the tapered outer circumferential surface 34 of the base member 8. However, the sleeve member 6 and the base member 8 may have inner and outer mutually engaging circumferential surfaces each having a constant diameter.

The mold portion 30 provided at the upper end of the base member 8 has a spherical molding surface 38 which is curved downwardly so as to have a concave shape. At the outer peripheral portion of this molding surface 38, there is formed an undercut in the form of a recess 42 which gives an annular protruding portion 40. The annular protruding portion 40 has an inclined surface which is downwardly inclined with respect to a rotating axis of the base member 8 at an angle of θ (equal to about 60°), as shown in FIG. 19. Accordingly, the annular protruding portion 40 is designed such that it does not interfere with a cutting tool when the lens blank is subjected to a cutting operation to form a peripheral portion of the contact lens, as described below in detail. This annular protruding portion 40 functions as lens blank holding means for holding the lens blank obtained on the base member 8 of the lower mold half 2.

Figure 2:
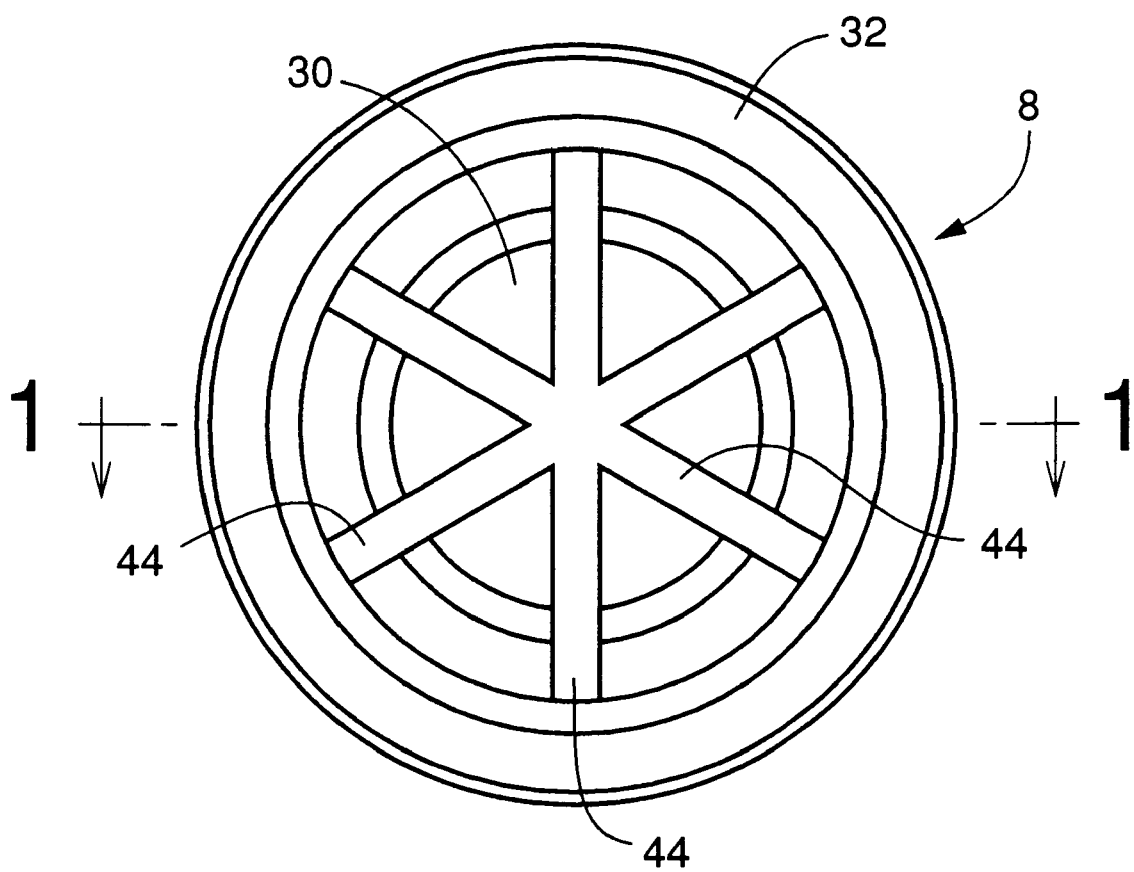
FIG. 2 is a bottom plan view of a base member of the lower mold half of the mold assembly of FIG. 1, which base member is shown in FIG. 1 in cross section taken along line 1—1.

The base portion 32 of the base member 8 is made hollow in an attempt to increase its dimensional accuracy while it is formed by injection molding. Within the hollow base portion 32, there are provided three reinforcing walls 44 as shown in FIG. 2. The reinforcing walls 44 are positioned in the hollow base portion 32 in an equiangularly spaced-apart relationship with one another in the circumferential direction of the base portion 32, so that each reinforcing wall extends between diametrically opposite points of the base portion 32.

In forming a lens blank which gives a contact lens, the upper mold half 4 and the lower mold half 2 are assembled or closed together as shown in FIG. 1, such that the tapered inner circumferential surface 24 of the sleeve member 6 is fitted on the tapered outer circumferential surface 34 of the base member 8, and such that the lower section of the cylindrical portion 10 of the upper mold half 4 is fitted in the large-diameter portion 18 of the sleeve member 6 of the lower mold half 2. When the upper and lower mold halves 4, 2 are closed together as described above, the substantially fluid-tight mold cavity 46 is formed between the thin spherical bottom wall 12 of the upper mold half 4 and the mold portion 30 of the base member 8 of the lower mold half 2. This mold cavity 46 has a predetermined axial dimension determined by the abutting contact of the lower end of the sleeve member 6 with the stop portion 36 of the base member 8 as described above, and its outer periphery is defined by the tapered inner circumferential surface 24 of the sleeve member 6.

The size of the mold cavity 46 is suitably determined depending upon how the upper mold half 4 and the lower mold half 2 are assembled together. In the present embodiment, the mold cavity 46 is dimensioned so that it gives a lens blank which has a diameter and a thickness that are larger than those of a contact lens to be obtained from the blank.

The thus formed mold cavity 46 is filled with a known monomer liquid which is polymerized to provide a polymer that gives the intended contact lens. Since the mold cavity 46 is substantially fluid-tightly sealed, the monomer liquid in the mold cavity 46 tends to expand or shrink upon heating during the polymerization to form the polymer. In the present embodiment, however, the spherical bottom wall 12 of the upper mold half 4 which partially defines the mold cavity 46 has a relatively small thickness and is deformable, so that an increase or decrease of the volume of the monomer liquid is effectively absorbed or accommodated by the deformation of the spherical bottom wall 12. Therefore, the polymer obtained by the polymerization of the monomer liquid, namely, the lens blank formed in the mold cavity 46 does not suffer from stresses which would otherwise be caused by the expansion of the monomer liquid. Further, the obtained lens blank is given an intended configuration without being adversely influenced by the shrinkage of the monomer liquid since the spherical bottom wall 12 effectively absorbs the shrinkage of the monomer liquid. In view of this, it is desirable that the spherical bottom wall 12 have a thickness as small as possible. For instance, the thickness of the spherical bottom wall 12 is generally not more than 2 mm, preferably not more than 1 mm.

The above-described problems which arise from the volume increase or decrease of the monomer liquid 60 are solved if the mold cavity 46 is open to the atmosphere. In some of the conventionally used mold assemblies, the mold cavity is not fluid-tightly closed, but communicates with the atmosphere. However, this arrangement suffers from another drawback that the polymerization of the monomer liquid in the mold cavity does not sufficiently proceed if the monomer liquid contacts the oxygen existing in the atmosphere. In addition, the monomer composition of the monomer liquid undesirably varies due to evaporation thereof. In view of this, the mold cavity 46 needs to be substantially fluid-tight.

It is to be understood that the present invention is not limited to the details of the illustrated embodiment, but may be otherwise embodied. There will be hereinafter described other embodiments of the lens blank forming mold assembly, referring to FIGS. 3–6.

Figure 3:
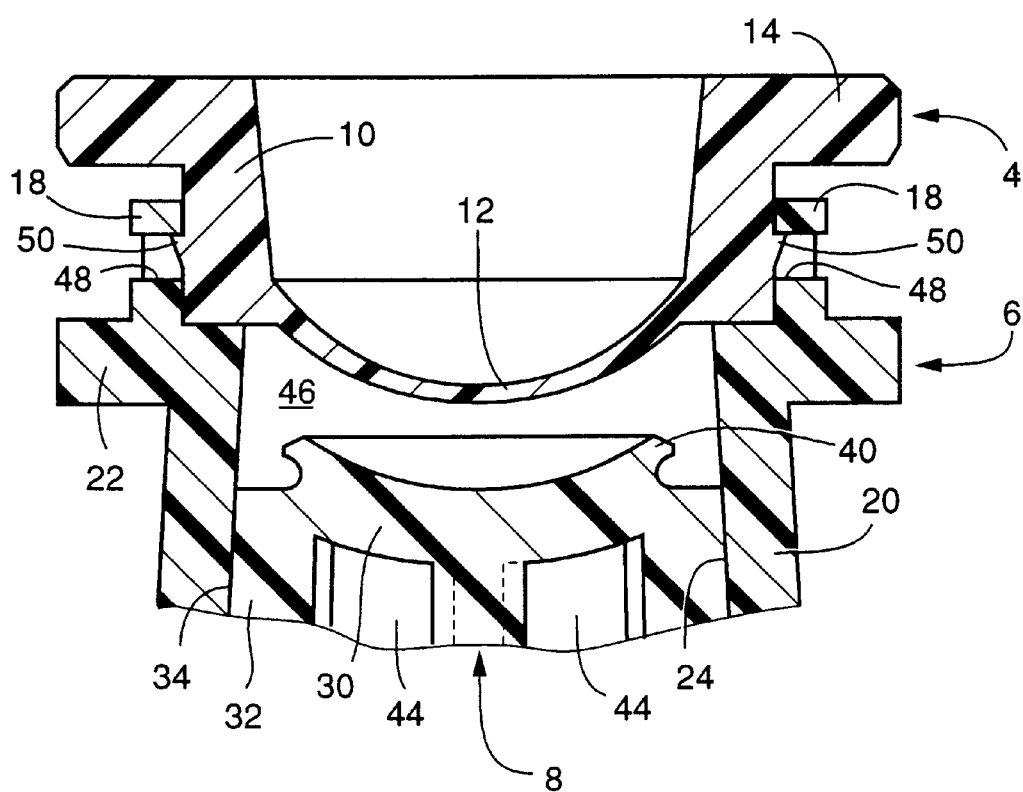
FIG. 3 is an elevational view in longitudinal cross section showing a mold assembly for forming a contact lens blank, which is constructed according to another embodiment of the present invention, when the upper and lower mold halves are closed together.

In the lens blank forming mold assembly of FIG. 3, the large-diameter portion 18 of the sleeve member 6 is formed with a suitable number of rectangular windows 48, which are spaced apart from each other at a suitable interval in the circumferential direction of the mold assembly. The cylindrical portion 10 of the upper mold half 4 has engaging portions 50 formed at respective portions of the outer circumferential surface corresponding to the windows 48. In this arrangement, the cylindrical portion 10 of the upper mold half 4 is fitted in the large-diameter portion 18 of the sleeve member 6 such that the engaging portions 50 formed on the outer circumferential surface of the cylindrical portion 10 engages the respective windows 48 of the large-diameter portion 18, whereby the upper mold half 4 and the sleeve member 6 of the lower mold half 2 are assembled or closed together.

Figure 4:
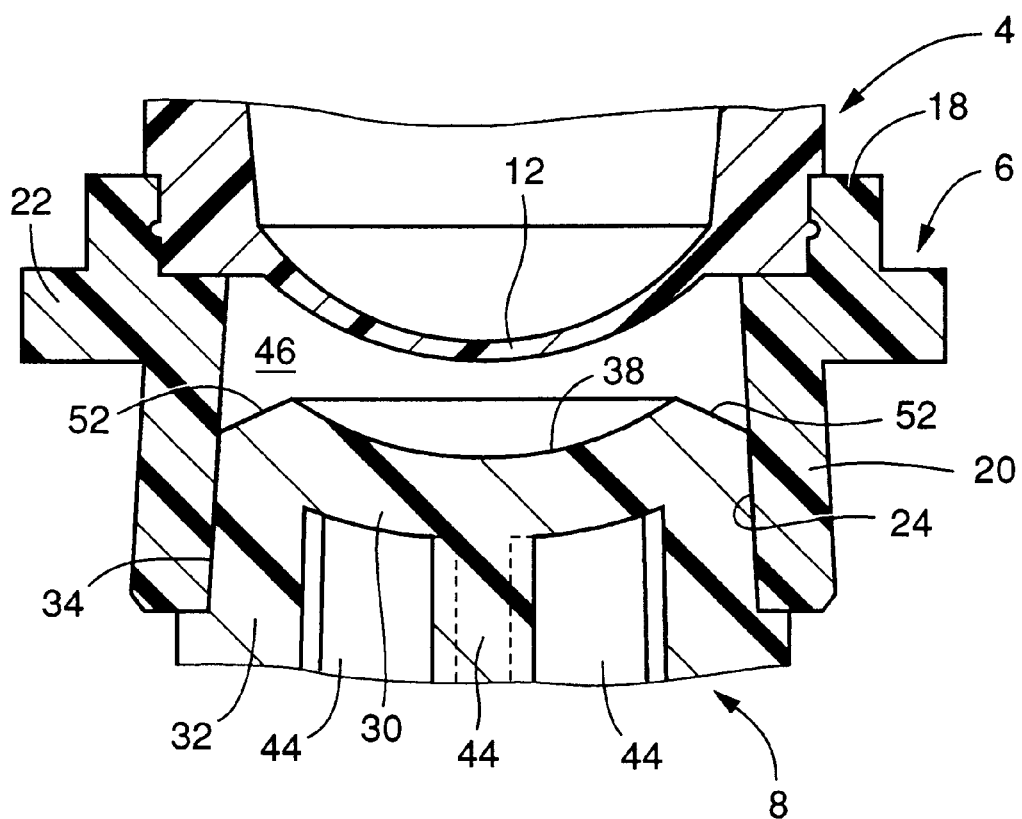
FIG. 4 is an elevational view in longitudinal cross section of a mold assembly constructed according to still another embodiment of the present invention, when the upper and lower mold halves are closed together.

Referring next to FIG. 4, there is shown the lens blank forming mold assembly which is constructed according to another embodiment of the present invention. This mold assembly has lens blank holding means different from that of the embodiment of FIG. 1. In the embodiment of FIG. 1, the lens blank holding means takes the form of the annular protrusion 40 provided by the undercut or recess 42. In the embodiment of FIG. 4, however, the outer peripheral portion of the upper surface of the mold portion 30 is provided with an inclined surface 52. This inclined surface 52 and the spherical molding surface 38 are subjected to a mirror finish treatment, whereby the lens blank to be formed in the mold cavity 46 effectively remains on the side of the base member 8 when the upper mold half 4 and the sleeve member 6 of the lower mold half 2 are removed from the base member 8.

The surface condition of the upper surface of the mold portion 30 consisting of the molding surface 38 and the inclined surface 54 influences a force with which the formed lens blank is held by the base member 8 after the upper mold half 4 and the sleeve member 6 are removed from the base member 8. It is found that the mirror-finished upper surface of the mold portion 30 exhibits a larger force for holding the lens blank thereon when it is mirror-finished, than an irregular or rough surface having minute protrusions and recesses. Alternatively, only the molding surface 38 is roughened or roughly textured, while the inclined surface 52 is mirror-finished. In this arrangement, the roughly textured molding surface 38 cooperates with the mirror-finished inclined surface 52 to adjust the holding force by which the lens blank is held on the base member 8.

Figure 5:
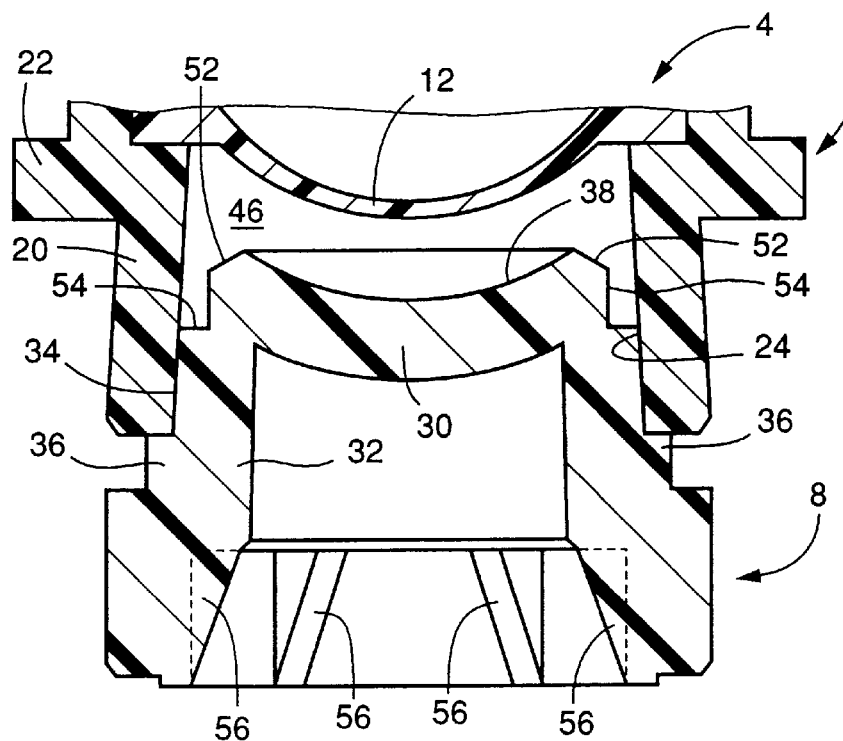
FIG. 5 is an elevational view in longitudinal cross section of a mold assembly constructed according to a yet another embodiment of the present invention, when the upper and lower mold halves are closed together.
Figure 6:
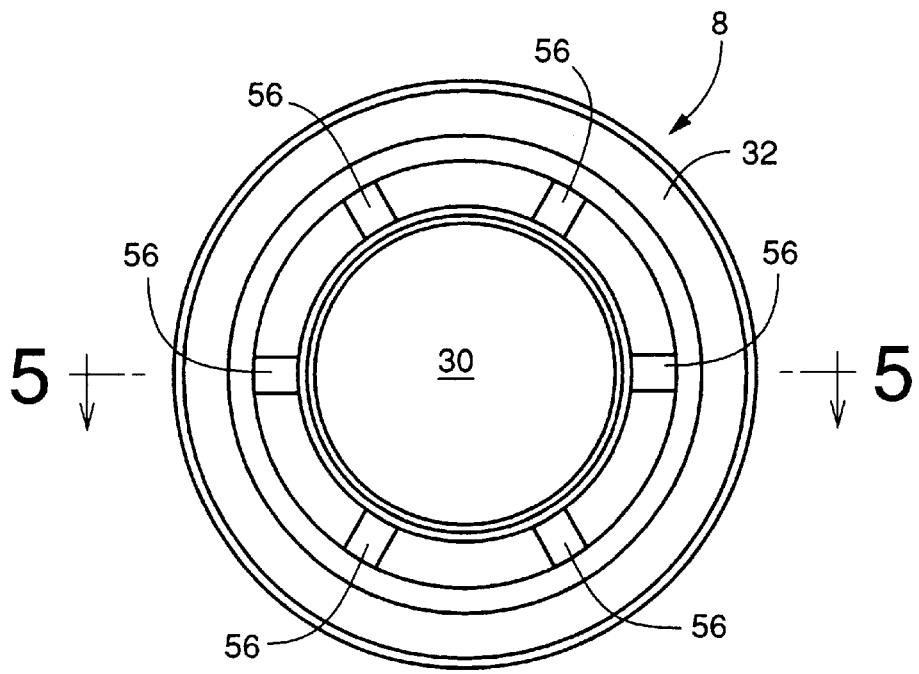
FIG. 6 is a bottom plan view of a base member of the lower mold half of the mold assembly of FIG. 5, which base member is shown in FIG. 5 in cross section along line 5—5.

Referring next to FIGS. 5 and 6, there is shown another embodiment of the lens blank forming mold assembly of the present invention. The mold assembly of this embodiment has lens blank holding means and reinforcing means different from those of the preceding embodiments. Described more specifically, in the present mold assembly, the lens blank holding means is constituted by the inclined surface 52 formed at the outer peripheral portion of the upper surface of the mold portion 30 of the base member 8, and a circumferential cutout 54 having an "L" shape in cross section and formed radially outwardly of the inclined surface 52. The inclined surface 52 and the surface of the cutout 54 are both mirror-finished so as to function as the lens blank holding means for holding the lens blank on the base member 8 when the upper mold half 4 and the sleeve member 6 are removed from the base member 8.

Within the hollow base portion 32 of the base member 8, there are provided a plurality of ribs 56 (six ribs in this embodiment) having a suitable thickness, such that the ribs 56 are located in the lower largest-diameter section of the base portion 32, and such that they are arranged equiangularly in the circumferential direction of the base portion 32. These ribs 56 are effective to improve the mechanical strength of the base portion 32 which is to be clamped by the chuck of the lathe.

Referring next to FIGS. 7–16, there will be explained a method of producing a contact lens by first forming a predetermined lens blank using the lens blank forming mold assembly as described above, and then effecting a working operation on the obtained lens blank while it is held by the lower mold half 2.

Figure 7:
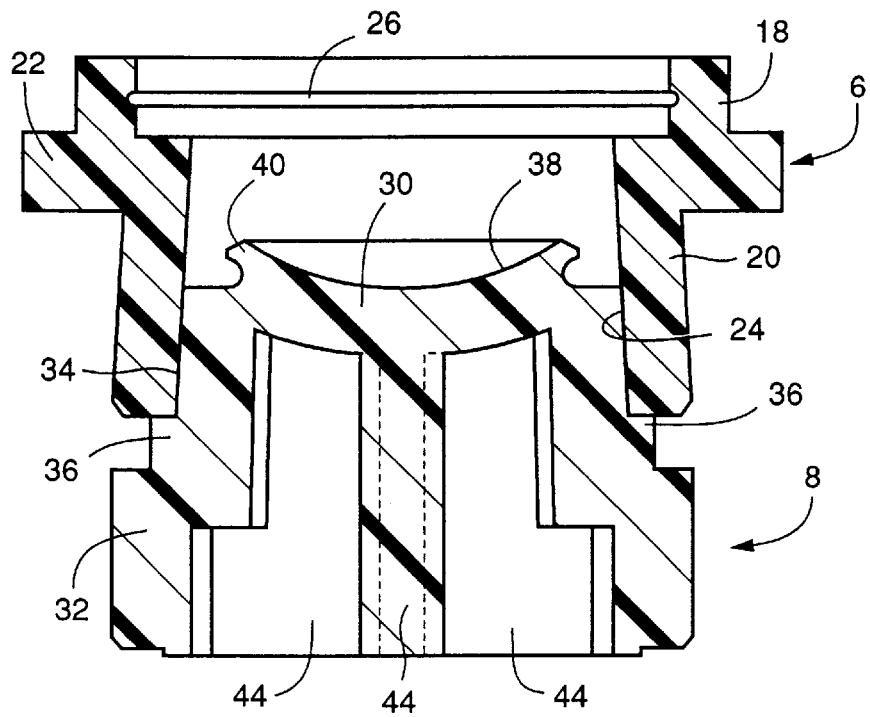
FIG. 7 is a view showing one process step of forming a contact lens using the mold assembly of FIG. 1, wherein a base member and a sleeve member of the lower mold half are assembled together.

In the method of producing the contact lens described hereinafter, the three-piece type mold assembly shown in FIGS. 1 and 2 are used. Initially, as shown in FIG. 7, the tapered inner circumferential surface 24 of the sleeve member 6 is fitted on the tapered outer circumferential surface 34 of the base member 8, so that the lower end of the sleeve member 6 is held in abutting contact with the stop portion 36 formed at the axially intermediate portion of the base member 8. By the abutting contact of the lower end of the sleeve member 6 and the stop portion 36 of the base member 8, the predetermined axial dimension of the mold cavity 46 is established. In the present embodiment, the sleeve member 6 and the base member 8 are assembled together such that the tapered inner circumferential surface 24 of the sleeve member 6 is fitted on the tapered outer circumferential surface of the base member 8, so as to assure the air-tightness or fluid-tightness (pressure tightness) between the two members 6, 8, while permitting easy assembling and disassembling of the two members 6, 8.

Figure 8:
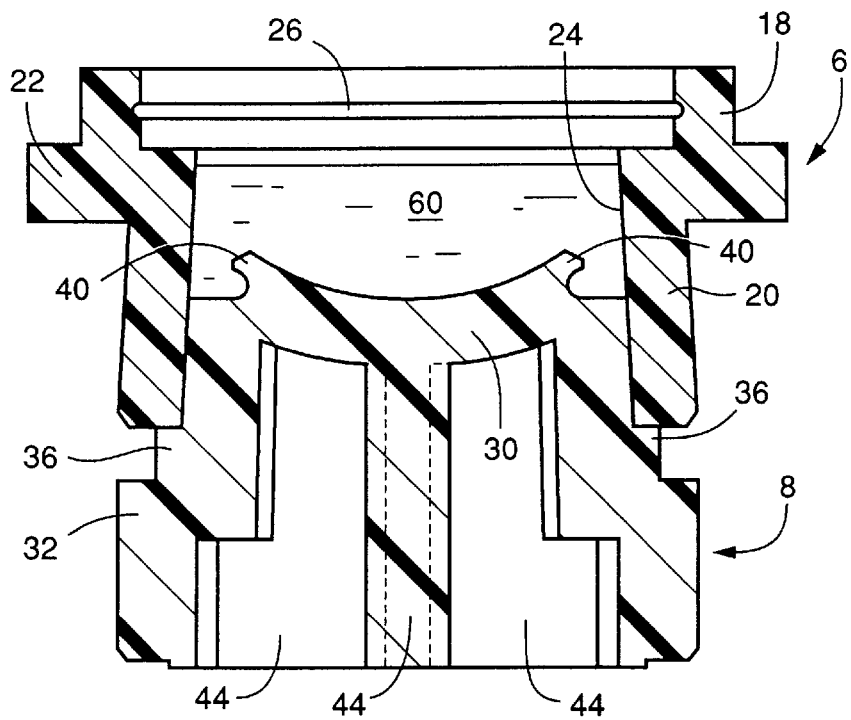
FIG. 8 is a view showing the assembled lower mold half of FIG. 7 consisting of the base member and the sleeve member, which lower mold half is filled with an injected monomer liquid.

With the sleeve member 6 being assembled with the base member 8 as described above, there is formed a recess that partially gives the mold cavity 46. The bottom of the recess is defined by the mold portion 30 while the diameter of the recess is determined by the tapered inner circumferential surface 24 of the sleeve member 6. A known monomer liquid 60 which gives a polymer of the intended contact lens is poured into the recess, as shown in FIG. 8. The monomer liquid 60 includes one or more of conventionally used radically polymerizable compounds. Alternatively, the monomer liquid may be composed of a macromer or a prepolymer. Such a compound includes at least one of vinyl, allyl, acryl and methacryl groups in its molecule, and is conventionally used as a material for a hard contact lens or a soft contact lens. Examples of the compound include: (meth)acrylates such as alkyl (meth)acrylate, siloxanyl (meth)acrylate, fuluoroalkyl (meth)acrylate, hydroxyalkyl (meth)acrylate, polyethyleneglycol (meth)acrylate and polyhydric alcohol (meth)acrylate; derivatives of styrene; and N-vinyllactam. The monomer liquid 60 includes, as needed, a polyfunctional monomer as a cross-linking agent, such as ethyleneglycol di(meth)acrylate or diethyleneglycol di(meth)acrylate. The monomer liquid 60 further includes, as additives, a polymerization initiator such as thermal polymerization initiator or photopolymerization initiator, and a photosensitizer.

Figure 9:
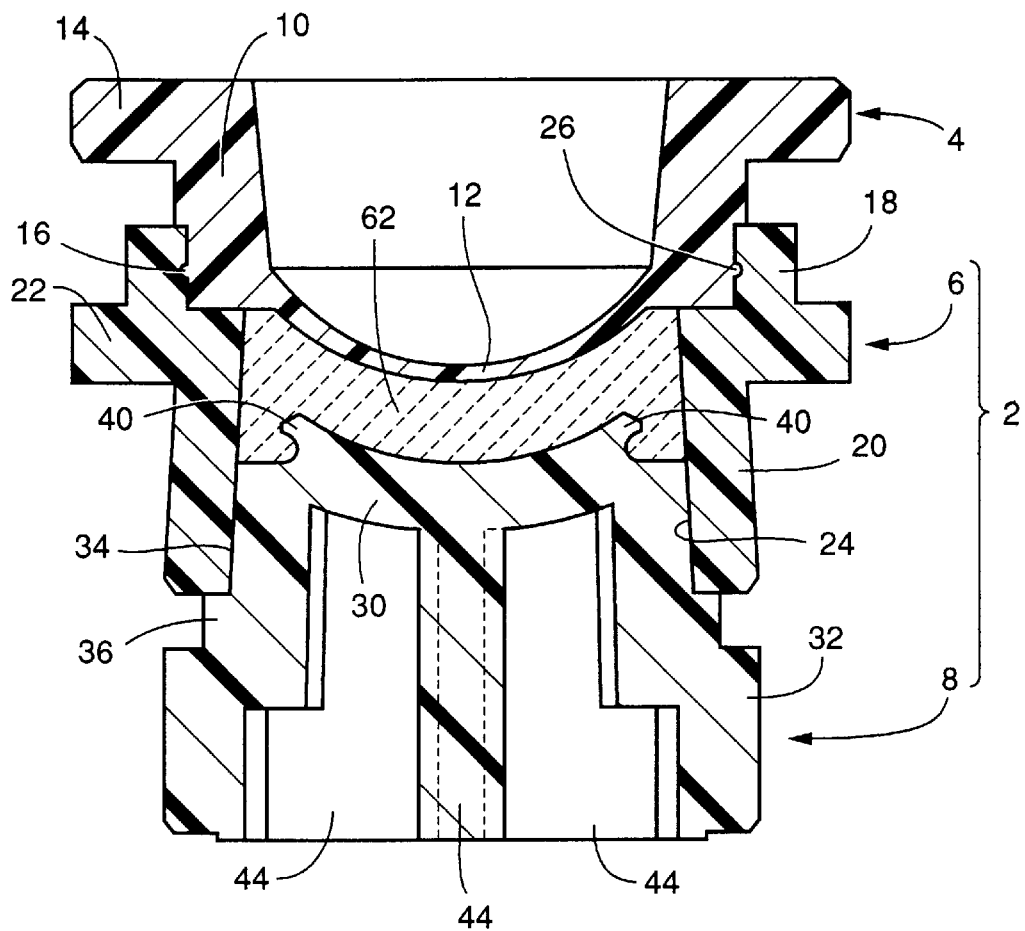
FIG. 9 is an elevational view in longitudinal cross section of the mold assembly, wherein the upper mold half is set on the sleeve member of the lower mold half after the injection of the monomer liquid, so that the monomer liquid is polymerized to provide an original lens blank.

After the recess is filled with the monomer liquid 60, the lower small-diameter section of the cylindrical portion 10 of the upper mold half 4 is fitted in the large-diameter portion 18 of the sleeve member 6, so that the annular protrusion 16 formed on the outer circumferential surface of the cylindrical portion 10 engages the circumferential groove 26 formed in the inner circumferential surface of the large-diameter portion 18, whereby the upper mold half 4 and the lower mold half 2 are assembled together, as shown in FIG. 9. Thus, the upper mold half 4 and the lower mold half 2 cooperate with each other to define the mold cavity 46 therebetween which has the predetermined axial dimension and which is filled with the monomer liquid 60. In this state, the monomer liquid 60 is polymerized by heating or photopolymerized by irradiation with a microwave such as an ultraviolet radiation, so that an original lens blank 62 is formed within the mold cavity 46, as shown in FIG. 9.

In assembling the upper mold half 4 and the lower mold half 2 as described above, any bubbles existing in the monomer liquid 60 are moved along the curved convex surface of the spherical bottom wall 12 of the upper mold half 4 toward the outer periphery of the mold cavity 46, whereby the original lens blank 62 to be obtained by polymerization of the monomer liquid 60 does not suffer from voids which would be caused by the bubbles.

Figure 10:
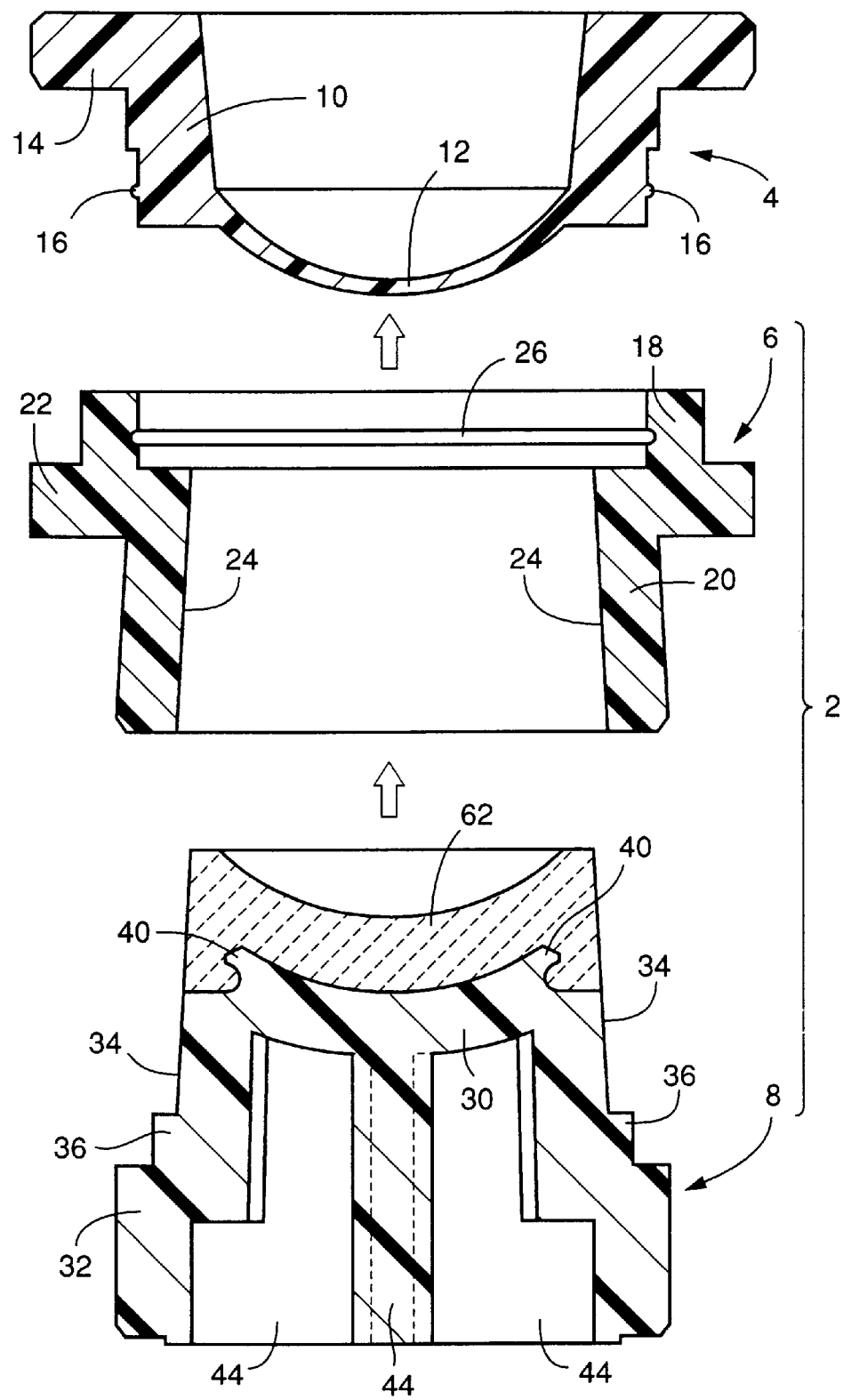
FIG. 10 is an elevational view in longitudinal cross section of the mold assembly of FIG. 9, wherein the upper mold half and the sleeve member are removed from the base member.

After the original lens blank 62 is formed by the polymerization of the monomer liquid 60 in the mold cavity 46 as described above, the mold assembly consisting of the upper mold half 4 and the lower mold half 2 is disassembled. More specifically described by referring to FIG. 10, the upper mold half 4 and the sleeve member 6 of the lower mold half 2 are moved in the upward direction away from the base member 8 as seen in FIG. 10 in the order of description. Alternatively, the upper mold half 4 and the sleeve member 6 which are engaged with each other may be removed together away from the base member 8. Further, the upper mold half 4 may be removed from the sleeve member 6 by collapsing the upper mold half 4 radially inwardly. After the upper mold half 4 and the sleeve member 6 are removed away from the base member 8, the formed original lens blank 62 remains on the base member 8 with high stability by means of the annular protrusion 40 as the lens blank holding means formed at the outer peripheral portion of the mold portion 30.

The thus obtained original lens blank 62 which is held on the base member 8 is subjected to a heat treatment, as needed, for the purpose of polymerizing any unpolymerized monomer remaining therein, whereby the polymerization of the monomer liquid (60) is completed. Thereafter, the obtained original lens blank 62 is subjected to suitable treatments for reducing residual distortion (strains) existing therein and removing cloudiness therefrom.

Figure 11:
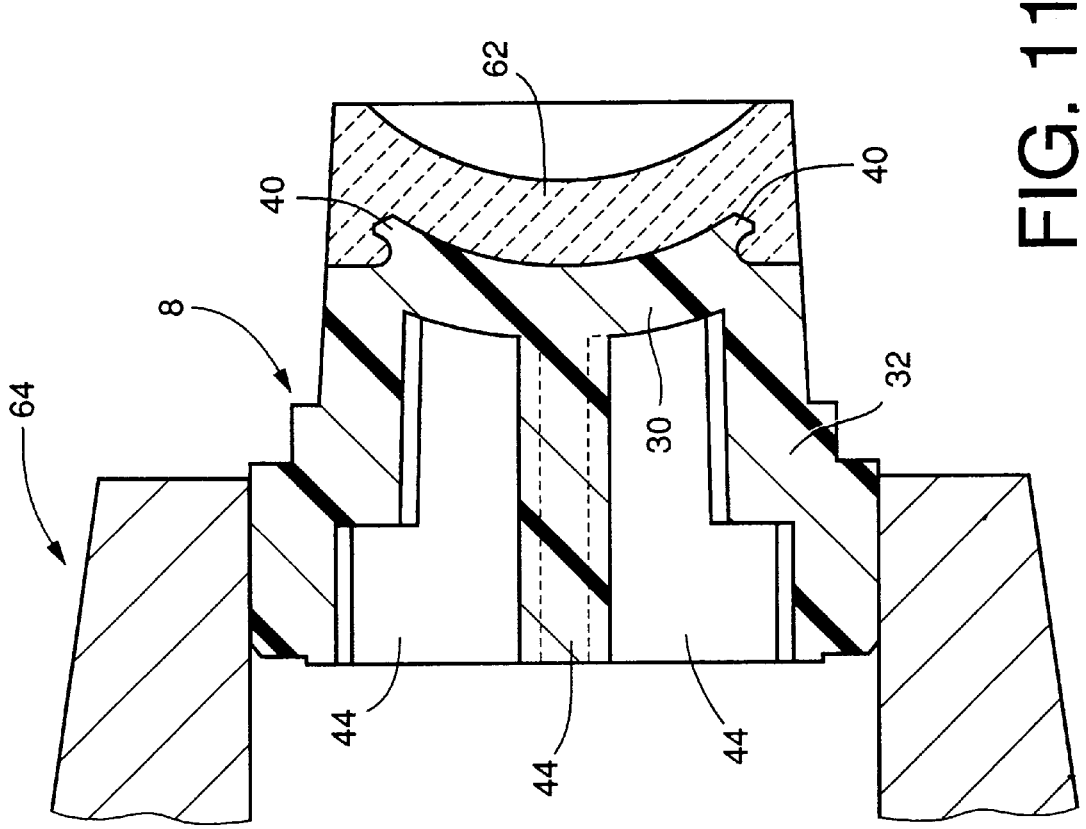
FIG. 11 is an elevational view in longitudinal cross section of the base member of the lower mold half which holds the original lens blank obtained with the mold assembly shown in FIG. 10, the base member being clamped by a chuck of a lathe.

The base member 8 of the lower mold half 4 which holds the original lens blank 62 thereon is clamped at its base portion 32 by a chuck 64 of a lathe or a turning machine as shown in FIG. 11, so that the original lens blank 62 is subjected to a cutting operation. Since the reinforcing walls 44 are provided within the hollow base portion 32 so as to increase its mechanical strength, the base portion 32 is prevented from being deformed due to a clamping force of the chuck 64 applied thereto in its diametric direction. Accordingly, the original lens blank 62 is free from an adverse influence during the cutting operations which would otherwise be caused by the deformation of the base portion 32.

Figure 12:
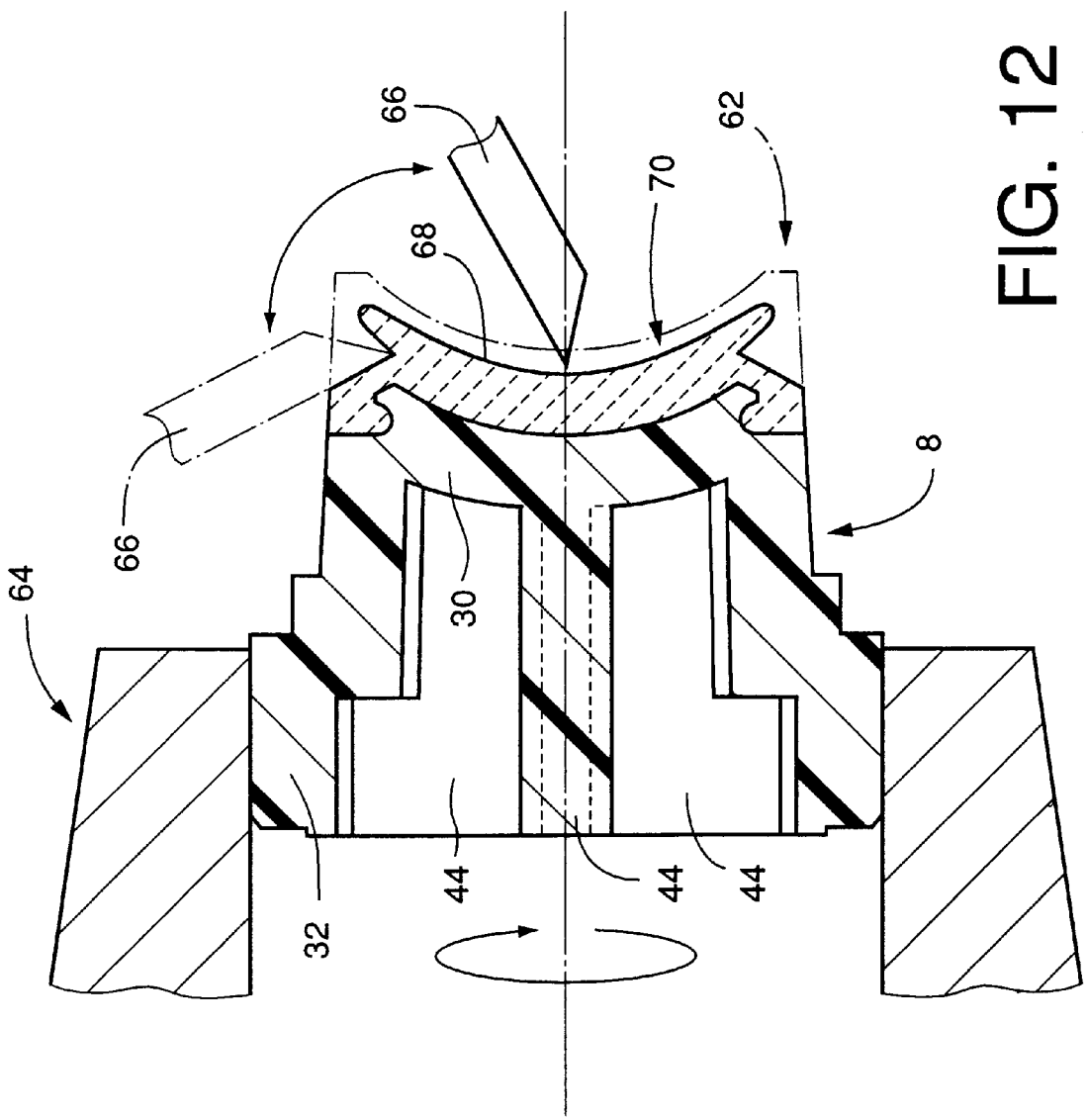
FIG. 12 is an elevational view in longitudinal cross section showing a secondary lens blank which is subjected to a cutting operation for forming a rear curved surface and a peripheral portion of the lens blank.

After the base portion 32 of the base member 8 of the lower mold half 2 is clamped by the chuck 64, the base member 8 is rotated about its axis, so that the original lens blank 62 held thereon is subjected to the cutting operation by a cutting tool 66 at one of its opposite surfaces which was held in contact with the spherical bottom wall 12 of the upper mold half 4, as shown in FIG. 12. Thus, there is produced a secondary lens blank 70 which has at least a or rear curved surface 68 (inner surface) of the contact lens to be formed, or the rear curved surface 68 and the peripheral portion of the contact lens. In this respect, it is noted that the surface of the original lens blank 62 which was cut to form the rear curved surface 68 follows the contour of the spherical bottom wall 12 of the upper mold half 4, which substantially follows the profile of the rear curved surface 68 of the contact lens to be obtained, so that the amount of wasting of the lens blank due to removal of the material by the cutting operation is reduced, and the cutting operation is simplified. The cutting operation may include a step of grinding the original or secondary lens blank 62, 70.

Figure 13:
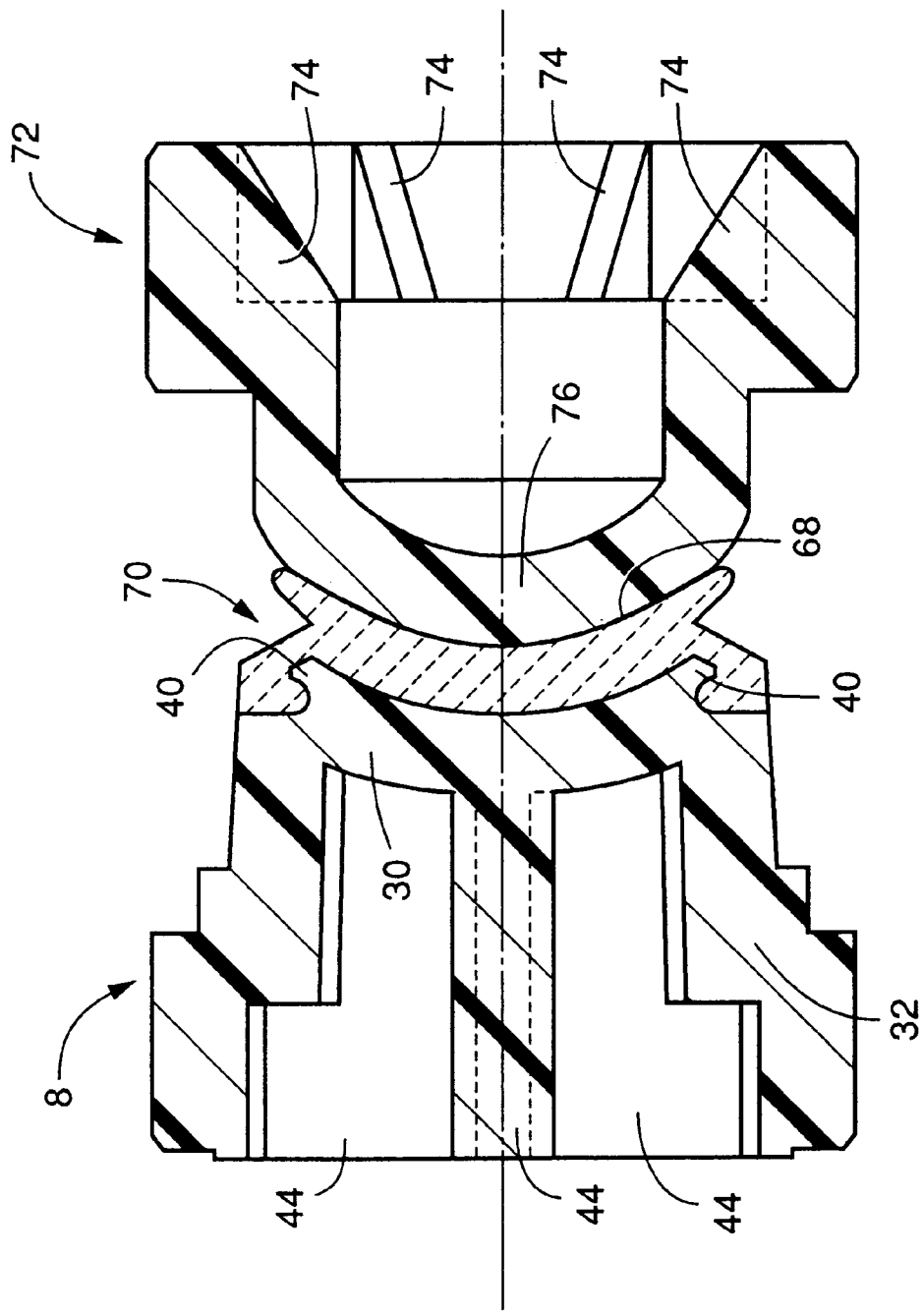
FIG. 13 is an elevational view in longitudinal cross section showing a secondary lens blank processed in the step of FIG. 12, to which a front surface cutting jig is bonded.

Subsequently, a front-surface cutting jig 72 as shown in FIG. 13 is tentatively bonded to the rear curved surface 68 of the secondary lens blank 70 obtained as described above, by using a known adhesive as disclosed in JP-B-7-80118, JP-A-3-81385 or JP-A-7-90241, for instance. The jig 72 is a hollow member made of a transparent resin material, and has a spherical top end 76 whose outer surface has a convex shape corresponding to the contour of the rear curved surface 68 of the secondary lens blank 70. The jig 72 permits transmission of an ultraviolet radiation therethrough so as so cure the adhesive applied between the convex outer surface of the top end 76 and the rear curved surface 68 of the secondary lens blank 70, whereby the jig 72 and the secondary lens blank 70 that is held by the base member 8 are bonded together. The jig 72 is provided with a suitable number of reinforcing ribs 74 similar to those provided in the base portion 32 of the base member 8 of FIG. 5, at an open end portion thereof opposite to the top end 76, so as to increase its mechanical strength when the jig 72 is clamped by the chuck at the open end portion as described below.

Figure 14:
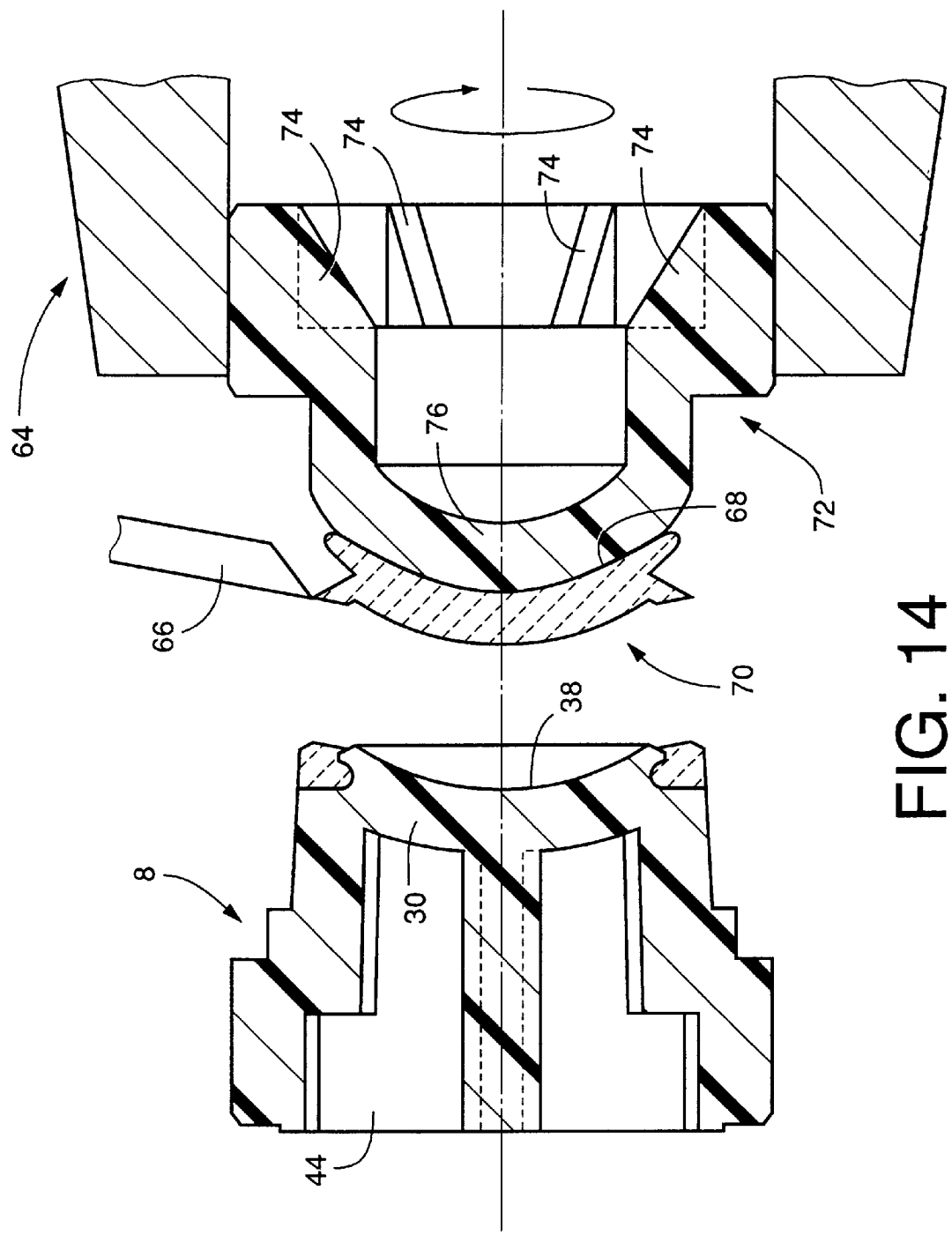
FIG. 14 is an elevational view in cross section showing a step of removing the base member of the lower mold half from the secondary lens blank to which the front surface cutting jig is bonded.

As shown in FIG. 14, the jig 72 which is bonded to the secondary lens blank 70 that is held by the base member 8 is clamped by the chuck 64 of the lathe, and is rotated about the axis thereof. In this state, the secondary lens blank 70 is subjected to a cutting operation by the cutting tool 66 at its peripheral portion, so as to separate the blank 70 from the base member 8, as shown in FIG. 14.

Figure 15:
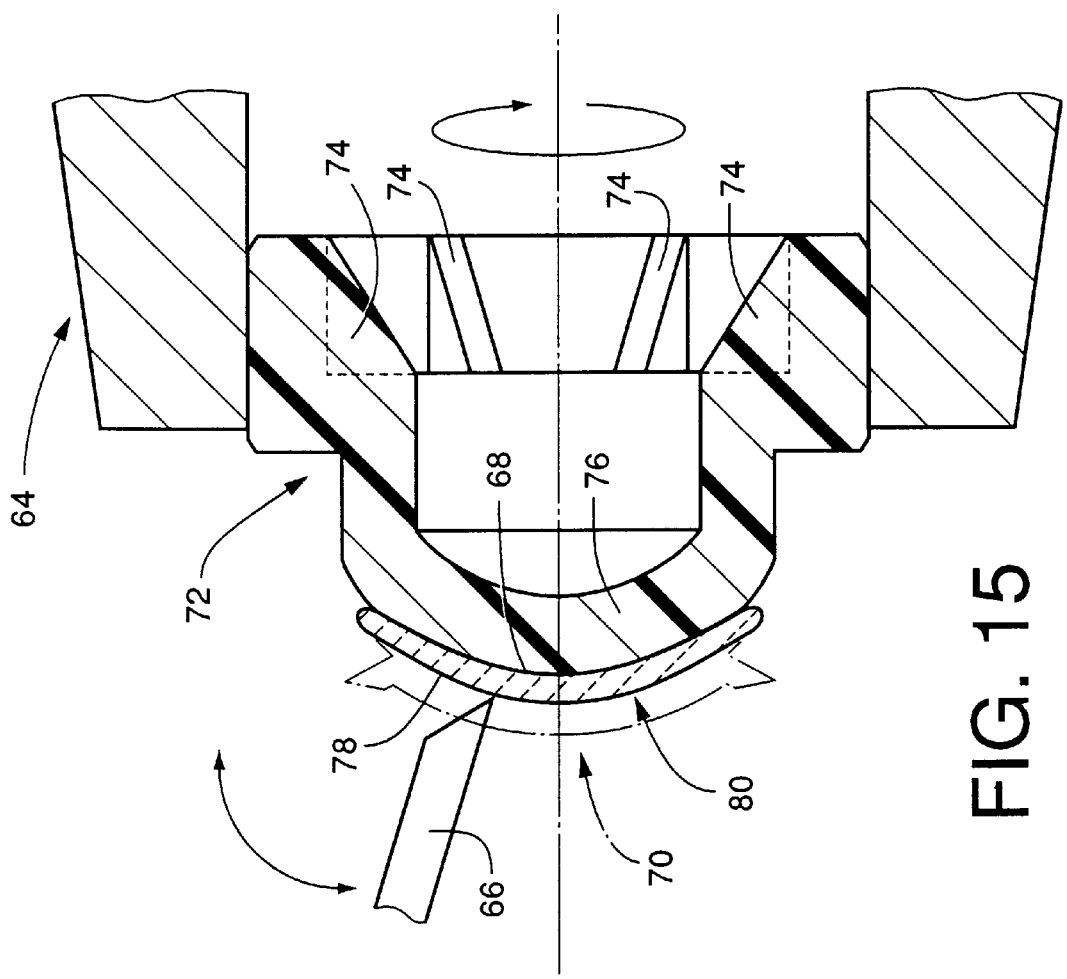
FIG. 15 is an elevational view in cross section showing a step of forming a front curved surface of the contact lens by effecting a cutting operation on the secondary lens blank bonded to the jig.

Subsequently, the surface of the secondary lens blank 70 opposite to the rear curved surface 68 is cut by the cutting tool 66 as shown in FIG. 15, to thereby form a front curved surface (outer surface) 78 of the contact lens. Thus, a desired contact lens 80 is produced.

The surface of the secondary lens blank 70 opposite to the rear curved surface 68 has a convex shape which follows the profile of the concave molding surface 38 formed on the mold portion 30 of the base member 8. Accordingly, the contour of the above-identified surface of the secondary lens blank 70 is similar to that of the front curved surface 78 of the contact lens 80 to be obtained. Therefore, the present arrangement minimizes the amount of stock of the lens blank to be removed by the cutting operation with the cutting tool 66 for forming the front curved surface 78 as described above, so that the amount of wasting of the expensive contact lens material is accordingly minimized.

The base member 8 is removed from the secondary lens blank 70 to which the jig 72 is bonded, by the cutting operation using the cutting tool 66 as indicated in FIG. 14. Alternatively, the base member 8 is removed from the secondary lens blank 70 by simply collapsing the upper part with a radially inward force applied thereto. Further, the base member 8 may be pulled away from the secondary lens blank 70 while it is compressed radially inwardly, so that the base member 8 is removed from the secondary lens blank 70. The base member 8 may be separated from the secondary lens blank 70 before the jig 72 is clamped by the chuck 64.

Figure 16:
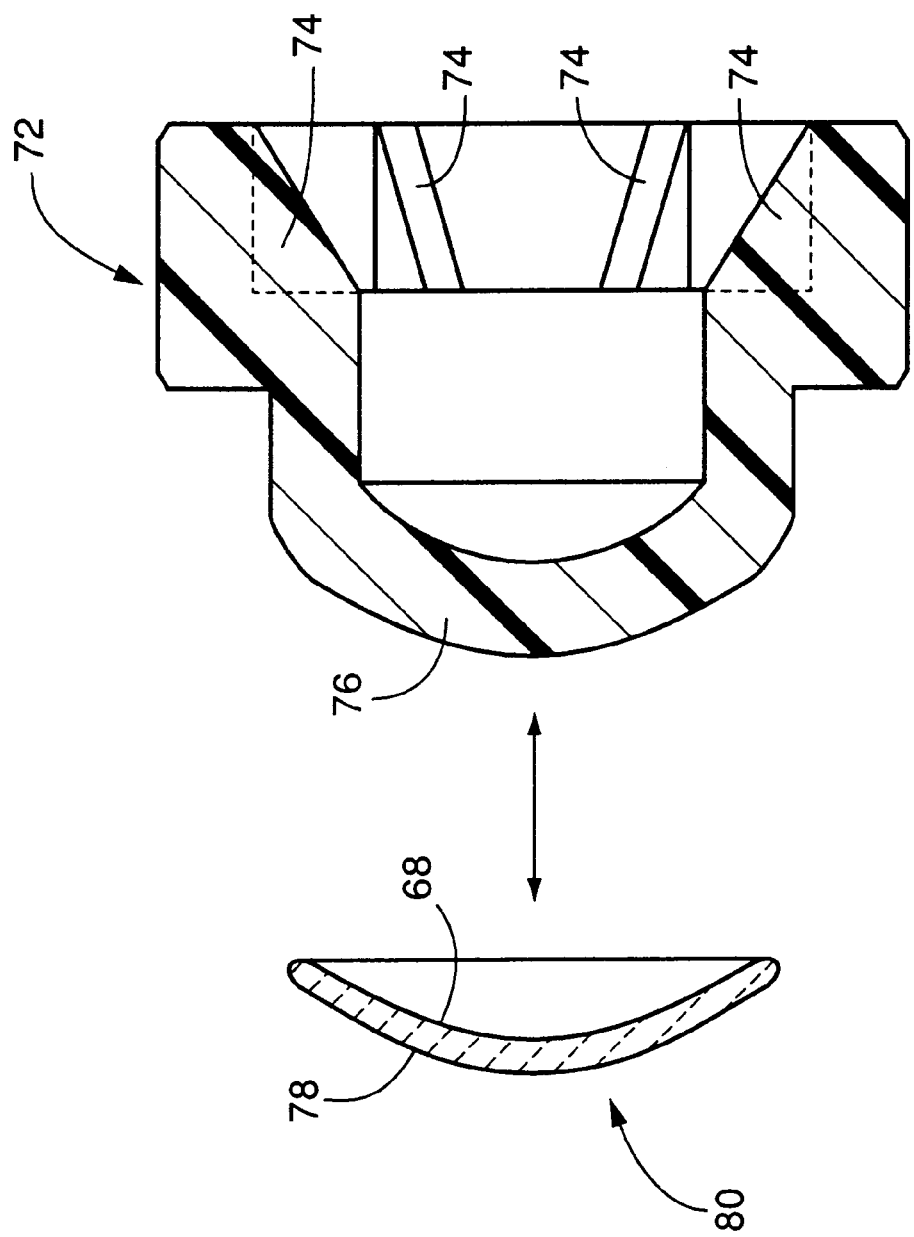
FIG. 16 is an elevational view in cross section showing the contact lens which is removed from the jig.

The produced contact lens 80 is removed from the convex outer surface of the top end 76 of the jig 72, as shown in FIG. 16, whereby the intended contact lens 80 is obtained. The contact lens 80 is removed from the jig 72 while it is immersed in a suitable solvent as well known in the art, so as to reduce the bonding strength of the adhesive applied between the rear curved surface 68 of the contact lens 80 and the convex outer surface of the top end 76 of the jig 72.

There has been described a method of producing a contact lens by using the three-piece type mold assembly including the upper mold half 4 and the lower mold half 2 consisting of the sleeve member 6 and the base member 8 which are formed separately from each other. However, the present method is equally applicable to a two-piece type mold assembly consisting of an upper and a lower mold half.

While the present invention has been described in detail in its presently preferred embodiments, it is to be understood that the invention is not limited to the details of the illustrated embodiments, but may be otherwise embodied.

Figure 17:
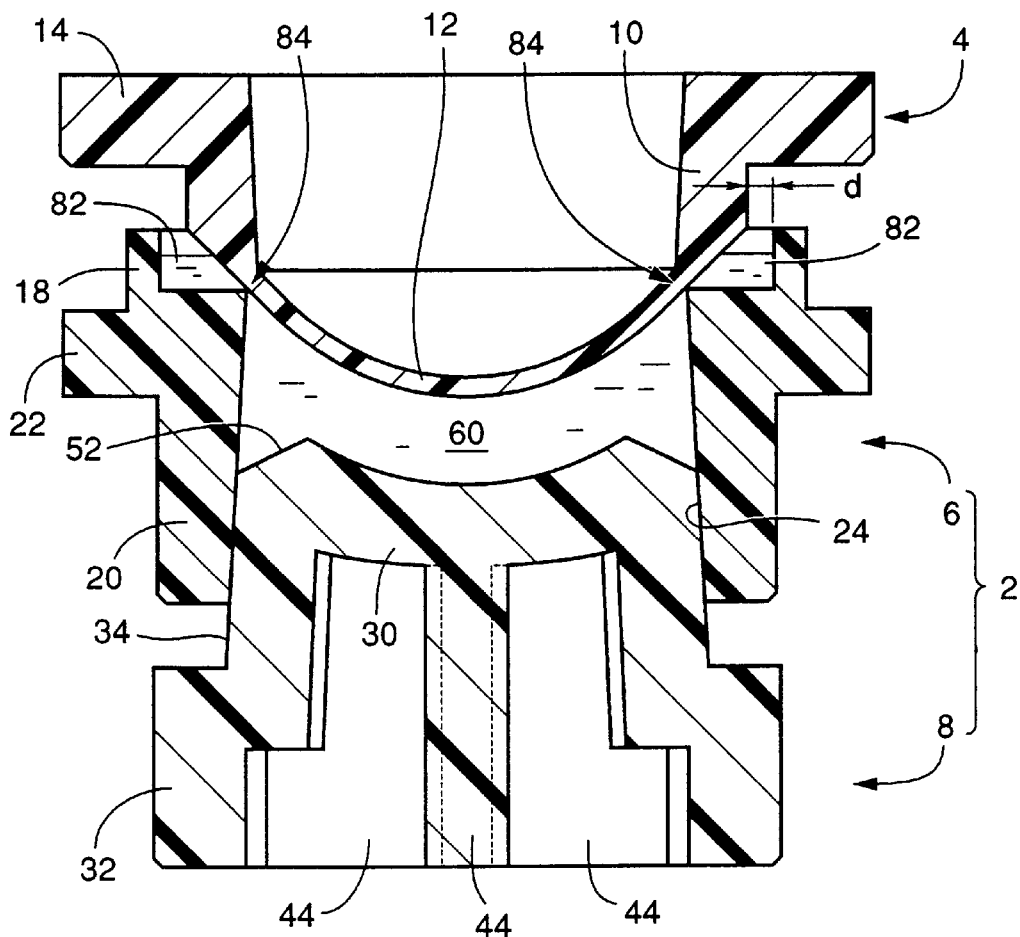
FIG. 17 is an elevational view in cross section showing a mold assembly for forming a contact lens blank, which is constructed according to another embodiment of the present invention, when the upper and lower mold halves are closed together.
Figure 18:
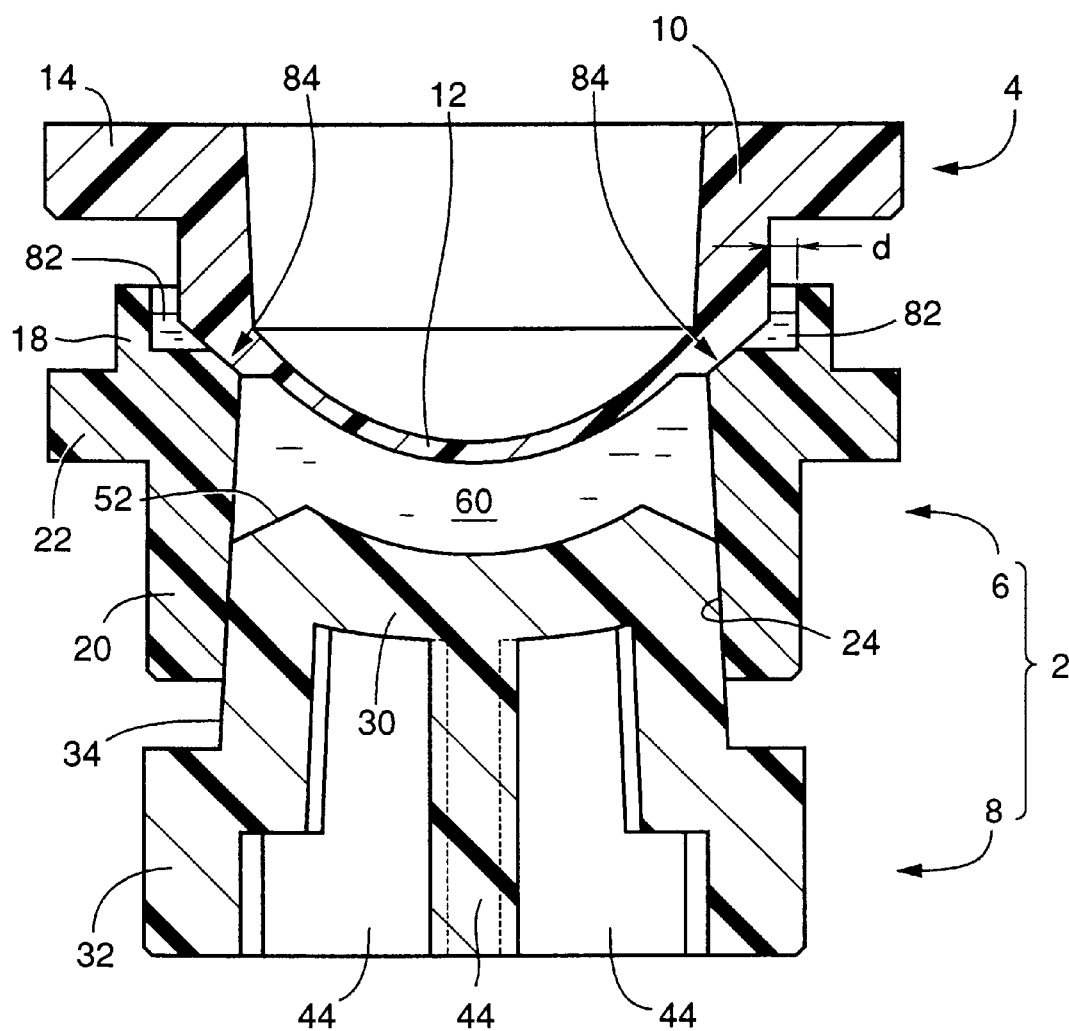
FIG. 18 is an elevational view in cross section of a mold assembly for forming a contact lens blank, which is constructed according to still another embodiment of the present invention, when the upper and lower mold halves are closed together.

In the illustrated embodiments, the upper mold half 4 is assembled with the sleeve member 6 of the lower mold half 2 such that the annular protrusion 16 formed on the outer circumferential surface of the cylindrical portion 10 of the upper mold half 4 is held in engagement with the groove 26 formed in the inner circumferential surface of the large-diameter portion 18 of the sleeve member 6, whereby the upper mold half 4 cooperates with the lower mold half 2 (consisting of the sleeve member 6 and the base member 8) to define the fluid-tight mold cavity 46 therebetween. However, the upper mold half 4 and the sleeve member 6 of the lower mold half 2 may be constructed for a line contact therebetween as shown in FIG. 17 or a face contact therebetween as shown in FIG. 18 when the upper and lower mold halves 4, 2 are assembled together. In this arrangement, too, the upper mold half 4 and the lower mold half 2 (consisting of the sleeve member 6 and the base member 8) cooperate with each other to define a substantially fluid-tightly sealed mold cavity therebetween. Further, the upper mold half 4 and the lower mold half 2 (the sleeve member 6) may be arranged so as to form a storage portion 82 for storing an excess of the monomer liquid, such that the storage portion 82 is located above a contacting portion 84 of the upper mold half 4 and the lower mold half 2 (the sleeve member 6) when the upper and lower mold halves 4, 2 are assembled together.

More specifically described, in the embodiment shown in FIG. 17, when the upper and lower mold halves 4, 2 are assembled together, the outer surface of the spherical bottom wall 12 of the upper mold half 4 is brought into abutting contact with the inner circumferential edge of the sleeve member 6, which defines the upper end of the tapered inner circumferential surface 24, so that the contacting portion 84 of the upper mold half 4 and the sleeve member 6 forms a line contact. The thus assembled upper and lower mold halves 4, 2 cooperate with each other to define the substantially fluid-tightly sealed mold cavity (46) therebetween which is filled with the monomer liquid 60.

In the embodiment shown in FIG. 18, portions of the upper mold half 4 and the sleeve member 6 which are brought into contact with each other have respective tapered or spherical surfaces which are held in engagement with each other, so that the contacting portion 84 of the upper mold half 4 and the sleeve member 6 forms a face contact when the upper mold half 4 and the sleeve member 6 are assembled together. The thus assembled upper mold half 4 and the sleeve member 6 cooperate with each other to define the substantially fluid-tightly sealed mold cavity (46) therebetween which is filled with the monomer liquid 60.

The mold assemblies shown in FIGS. 17 and 18 are provided with the storage portion 82 for storing an excess of the monomer liquid 60, such that the storage portion 82 is located above the contacting portion (84) of the upper mold half 4 and the lower mold half 2 (the sleeve member 6). Although the upper mold half 4 is formed with the deformable thin-walled portion (12) in an attempt to accommodate or absorb the expansion or shrinkage of the monomer liquid within the mold cavity (46) during the polymerization, the thin-walled portion (12) is not always capable of accommodating or absorbing the expansion or shrinkage of the monomer liquid to a satisfactory extent since the mold cavity (46) is substantially fluid-tightly formed by the lower mold half 2 and the upper mold half 4. In this case, the lens blank (62) obtained by the polymerization of the monomer liquid 60 does not have a predetermined or intended configuration which follows the profile of the convex outer surface of the thin-walled portion (12) due to the shrinkage of the monomer liquid. For instance, the upper surface of the obtained lens blank (62) may undesirably have a corrugated shape. To avoid this problem caused by the shrinkage of the monomer liquid during its polymerization as described above, the mold assembly preferably has the storage portion (82) for storing the excess of the monomer liquid (60). If the monomer liquid stored in the storage portion (82) is supplied therefrom into the mold cavity (46), the configuration of the obtained lens blank is not adversely influenced by the shrinkage of the monomer liquid during its polymerization.

As shown in FIGS. 17 and 18, the mold assembly of the present invention may be arranged such that the inner circumferential surface of the large-diameter portion 18 is radially spaced from the outer circumferential surface of the cylindrical portion 10 of the upper mold half 4 by a predetermined radial distance "d", at the upper axial end of the sleeve member 6 of the lower mold half 2. In this case, the radial distance "d" needs to be at least 0.2 mm. If the radial distance "d" between the upper axial end (i.e., the large-diameter portion 18) of the lower mold half 2 (i.e., the sleeve member 6) and the upper mold half 4 (i.e., the cylindrical portion 10) is less than 0.2 mm, the monomer liquid 60 (poured in the recess defined between the upper surface of the mold portion 30 of the base member 8 and the tapered inner circumferential surface 24 of the sleeve member 6) tends to rise along the outer circumferential surface of the upper mold half 4 due to the surface tension when the spherical thin-walled portion 12 of the upper mold half is brought into contact with the monomer liquid during the assembling of the upper mold half 4 with the lower mold half 2. In this case, the bubbles existing in the monomer liquid 60 may remain in the mold cavity. To overcome this drawback, it is necessary to first fill the above-indicated recess with the monomer liquid, and then assemble the upper mold half 4 with the lower mold half 2 while permitting an excessive amount of the monomer liquid 60 to flow from the recess out of the mold assembly. This arrangement, however, inevitably causes wasting of some amount of the monomer liquid 60. In view of this, the radial distance "d" as indicated above is at least 0.2 mm, preferably at least 0.3 mm, more preferably at least 0.4 mm.

Figure 19A:
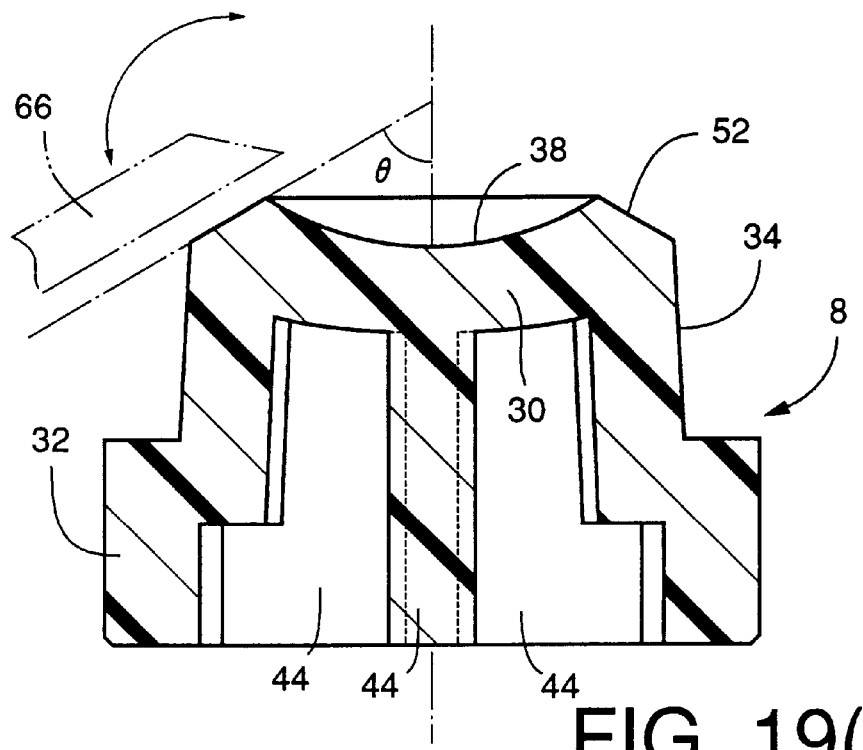
FIG. 19(a) is a cross sectional view showing a relative positional relationship between the cutting tool and the base member of the lower mold half of FIG. 17 during the cutting operation on the lens blank.
Figure 19B:
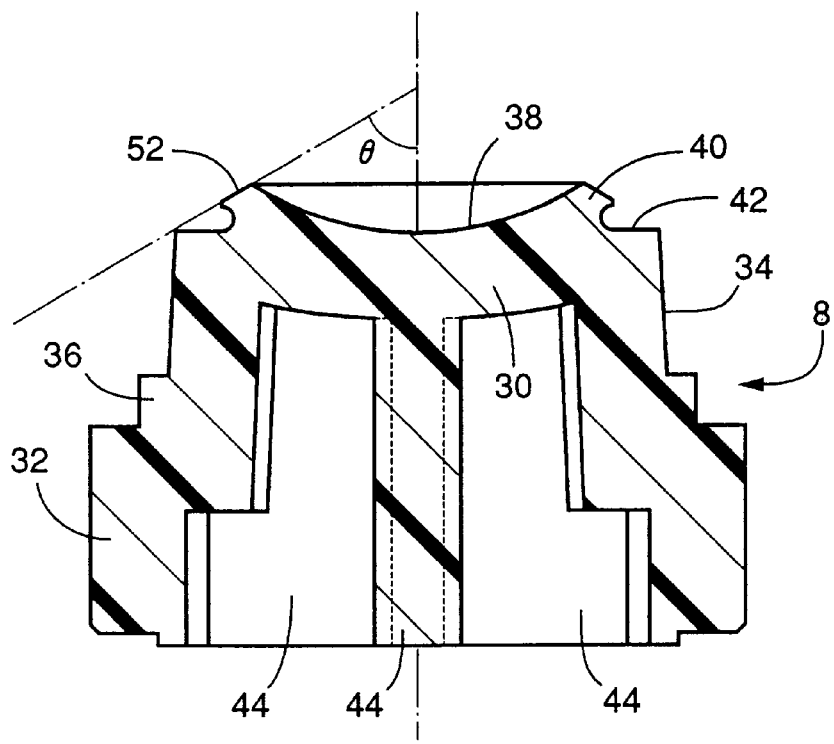
FIG. 19(b) is a cross sectional view showing an angle of the cutting tool with respect to the base member of the lower mold half of FIG. 1.

As shown in FIGS. 19(a) and 19(b), the mold portion 30 of the lower mold half 2 (i.e., the base member 8) which serves as the lens blank holding means is chamfered at its periphery to provide the inclined surface 52, which is inclined by an angle θ with respect to the rotating axis of the base member 8. In this arrangement, when the lens blank (62) held by the base member 8 is subjected to the cutting operation by the cutting tool 66 for forming the peripheral portion and a part of the front curved surface of the contact lens while the lower mold half 2 (i.e., the base member 8) is clamped by the chuck of the lathe, the cutting tool 66 does not interfere with the lens blank holding means provided on the base member 8. This arrangement is intended to avoid a possibility that the lens blank (62) is removed from the base member 8 during the cutting operation due to cutting of the lens blank holding means by the cutting tool 66.

While the inclination angle θ of the inclined surface 52 with respect to the rotating axis of the base member 8 is suitably determined depending upon the angle of a path of the cutting tool 66, it is generally 60° or smaller.

As is apparent from the above description, the amount of the contact lens material which is wasted is minimized because the contact lens is produced from the lens blank which is formed by using the present mold assembly. Further, the contact lens formed of the lens blank which is obtained by using the present mold assembly is uniform in its quality and free from distortion. The present arrangement provides the lens blank for various types of contact lenses. The present method of producing a contact lens permits mass production of the various contact lenses at a reduced cost with high production efficiency in a simplified process wherein the formation of the lens blank, i.e., the polymerization of the lens material and the machining operations on the formed lens blank can be successively effected.

What is claimed is:

1. A mold assembly for forming a lens blank which gives a contact lens, said mold assembly comprising an upper mold half and a lower mold half which cooperate with each other to define a substantially fluid-tight mold cavity when said upper and lower mold halves are assembled together, said mold cavity being filled with a monomer liquid which is polymerized to provide said lens blank that is to be subjected to a cutting operation for forming a base curved surface and a front curved surface of said contact lens, wherein the improvement comprises:

said upper mold half including a flexible thin-walled portion which has a downwardly convex shape and which partially defines said mold cavity, said thin-walled portion being deformable so as to absorb expansion or shrinkage of said monomer liquid during polymerization thereof in said mold cavity; and said lower mold half including a base portion at which said lower mold half is clamped by a chuck of a lathe during said cutting operation, and a mold portion having a molding surface which is provided with lens blank holding means for holding said lens blank on said lower mold half, said lens blank being formed in said mold cavity defined by and between said upper and lower mold halves wherein said base portion of said lower mold half is a hollow cylindrical member which includes reinforcing means provided in said hollow cylindrical member.

2. A mold assembly according to claim 1, wherein said upper and lower mold halves are formed of a synthetic resin material.

3. A mold assembly according to claim 1, wherein said thin-walled portion has a thickness of not more than 2 mm.

4. A mold assembly according to claim 1, wherein said reinforcing means is comprises a plurality of reinforcing walls which are positioned in said hollow cylindrical member in an equiangularly spaced-apart relationship with one another in the circumferential direction of said base portion, so that each of said reinforcing walls extends between diametrically opposite points of said base portion.

5. A mold assembly according to claim 1, wherein said hollow cylindrical member has a lower end portion remote from said mold portion, and said reinforcing means comprises a plurality of ribs which are positioned in said lower end portion, such that they are arranged equiangularly in the circumferential direction of said base portion.

6. A mold assembly according to claim 1, wherein said lens blank holding means comprises a recess or protrusion provided on said molding surface of said lower mold half, said recess or said protrusion giving said lens blank an anchor portion for holding said lens blank on said base portion.

7. A mold assembly according to claim 1, wherein said lower mold half includes a base member having said base portion and a sleeve member which removably and fluid-tightly engages said base member, said lens blank holding means being provided on said base member.

8. A mold assembly according to claim 7, wherein said sleeve member has a tapered inner circumferential surface whose diameter reduces in an upward direction of said mold assembly while said base member has a tapered outer circumferential surface whose diameter reduces in said upward direction, said tapered inner circumferential surface of said sleeve member being fluid-tightly fitted on said tapered outer circumferential surface of said base member, so as to partially define said mold cavity.

9. A mold assembly according to claim 1, wherein said upper mold half and said lower mold half contacts each other when said upper mold half and said lower mold half are assembled together, to thereby provide a contacting portion and a storage portion for storing an excess of said monomer liquid, said storage portion being located above said contacting portion.

10. A mold assembly according to claim 1, wherein said sleeve member of said lower mold half includes a large-diameter portion while said upper mold half includes a cylindrical portion, said large-diameter portion of said sleeve member and said cylindrical portion of said upper mold half being radially opposed to each other with a radial distance of at least 0.2 mm therebetween when said upper and lower mold halves are assembled together.

11. A mold assembly according to claim 1, wherein said substantially fluid-tight mold cavity is sealed by a line contact or a face contact between said lower and upper mold halves when said upper and lower mold halves are assembled together.

12. A mold assembly according to claim 1, wherein said lens blank holding means provided on said molding surface of said lower mold half has an inclined surface which is inclined with respect to a direction of relative movement of said upper and lower mold halves for assembling thereof into the mold assembly, so as to prevent a cutting tool from interfering with said lens blank holding means when said lens blank held by said lower mold half is subjected to said cutting operation by said cutting tool for forming a peripheral portion and a part of said front curved surface of said contact lens while said lower mold half is clamped by said chuck and rotated on said lathe.

* * * * *